US012567101B1

(12) United States Patent (10) Patent No.: US 12,567,101 B1
Yergan et al. (45) Date of Patent: Mar. 3, 2026

(54) SYSTEMS AND METHOD FOR CUSTOMIZED RETAIL ENVIRONMENTS

(71) Applicant: Amazon Technologies, Inc., Seattle, WA (US)

(72) Inventors: Christopher John Yergan, Seattle, WA (US); Saurabh Kumar, Seattle, WA (US); Anisha Gulabani, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 504 days.

(21) Appl. No.: 17/955,416

(22) Filed: Sep. 28, 2022

(51) Int. Cl.
*G06Q 30/0601* (2023.01)

(52) U.S. Cl.
CPC ..... *G06Q 30/0635* (2013.01); *G06Q 30/0623* (2013.01); *G06Q 30/0639* (2013.01); *G06Q 30/0641* (2013.01)

(58) Field of Classification Search
CPC .... G06Q 30/0623–062; G06Q 30/0641–0643; G06Q 30/0613–0619; G06Q 10/047; G06Q 30/0633–0639; G06Q 30/06
See application file for complete search history.

(56) References Cited

U.S. PATENT DOCUMENTS 8,474,711 B2 * 7/2013 Ulrich ................ G06Q 30/0603
235/383
9,117,106 B2 8/2015 Dedeoglu et al.

9,235,928 B2 1/2016 Medioni et al.
9,473,747 B2 10/2016 Kobres et al.
2011/0016015 A1 * 1/2011 Bolivar .............. G06Q 30/0601
706/52
2013/0284806 A1 10/2013 Margalit
2013/0317921 A1 * 11/2013 Havas ................ G06Q 30/0641
705/15
2017/0323375 A1 * 11/2017 Slater ................... A61B 5/7225
2018/0240180 A1 * 8/2018 Glaser .................. G07G 1/0081
2020/0198680 A1 * 6/2020 Hagen ..................... H04W 4/38
2020/0302510 A1 * 9/2020 Chachek ............... G06V 20/52
2021/0182921 A1 * 6/2021 Onkels .................. G06Q 20/18
2023/0385875 A1 * 11/2023 Nigul ................ G06Q 30/0261

FOREIGN PATENT DOCUMENTS

AU 2012201009 A1 * 3/2012

* cited by examiner

*Primary Examiner* — Kelly S. Campen
*Assistant Examiner* — Katherine A Barlow
(74) *Attorney, Agent, or Firm* — Kilpatrick Townsend & Stockton LLP

(57) ABSTRACT

This disclosure describes, in part, systems for enabling facilities to implement techniques to determine when users are in possession of items when located within and/or exiting the facilities. For instance, a system may use one or more sensors of a facility and of a mobile apparatus to determine interactions with items in a facility. The system may determine confidence scores for the interactions and may direct the user to varying checkout experiences based on the confidence scores associated with virtual carts of their items and may enable additional user experiences and interactions with the facility and items of the facility to improve customer experiences.

20 Claims, 12 Drawing Sheets

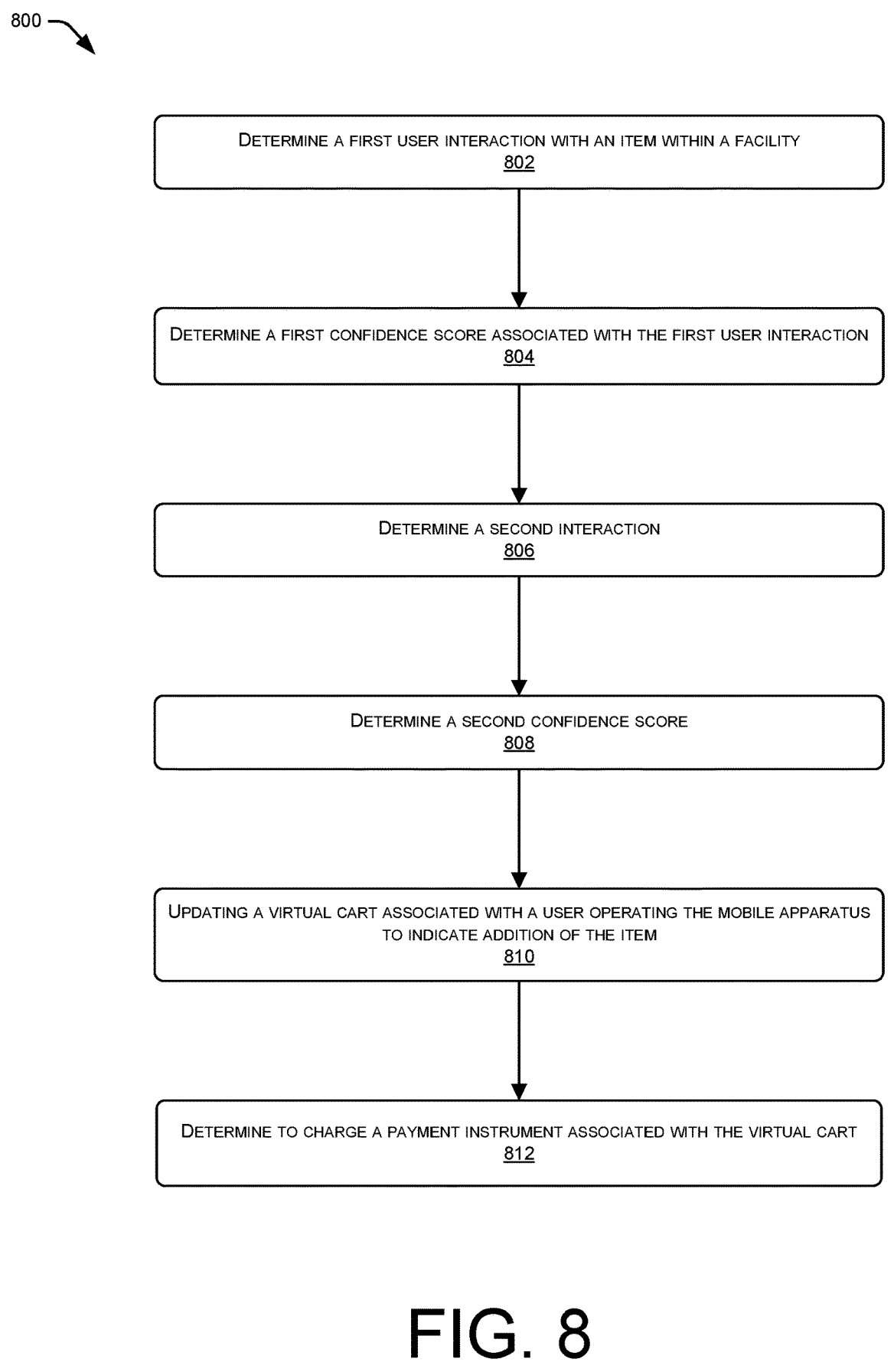

800 —

DETERMINE A FIRST USER INTERACTION WITH AN ITEM WITHIN A FACILITY
802

DETERMINE A FIRST CONFIDENCE SCORE ASSOCIATED WITH THE FIRST USER INTERACTION
804

DETERMINE A SECOND INTERACTION
806

DETERMINE A SECOND CONFIDENCE SCORE
808

UPDATING A VIRTUAL CART ASSOCIATED WITH A USER OPERATING THE MOBILE APPARATUS
TO INDICATE ADDITION OF THE ITEM
810

DETERMINE TO CHARGE A PAYMENT INSTRUMENT ASSOCIATED WITH THE VIRTUAL CART
812

FIG. 8

900 —
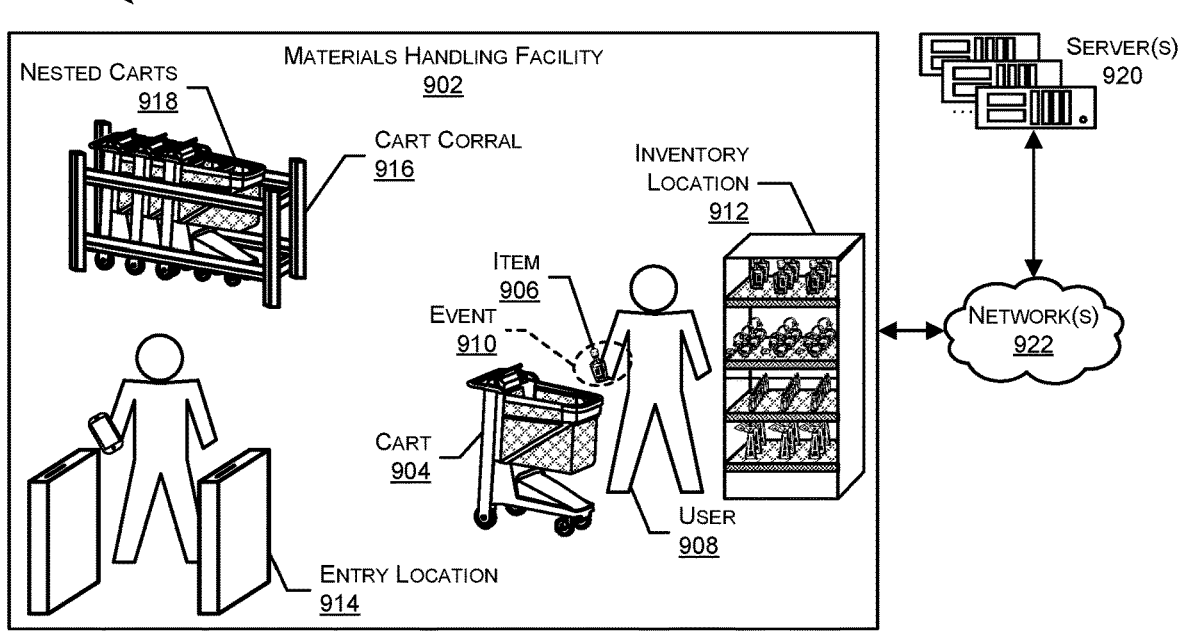
MATERIALS HANDLING FACILITY 902
NESTED CARTS 918
CART CORRAL 916
INVENTORY LOCATION 912
ITEM 906
EVENT 910
CART 904
USER 908
ENTRY LOCATION 914
SERVER(S) 920
NETWORK(S) 922
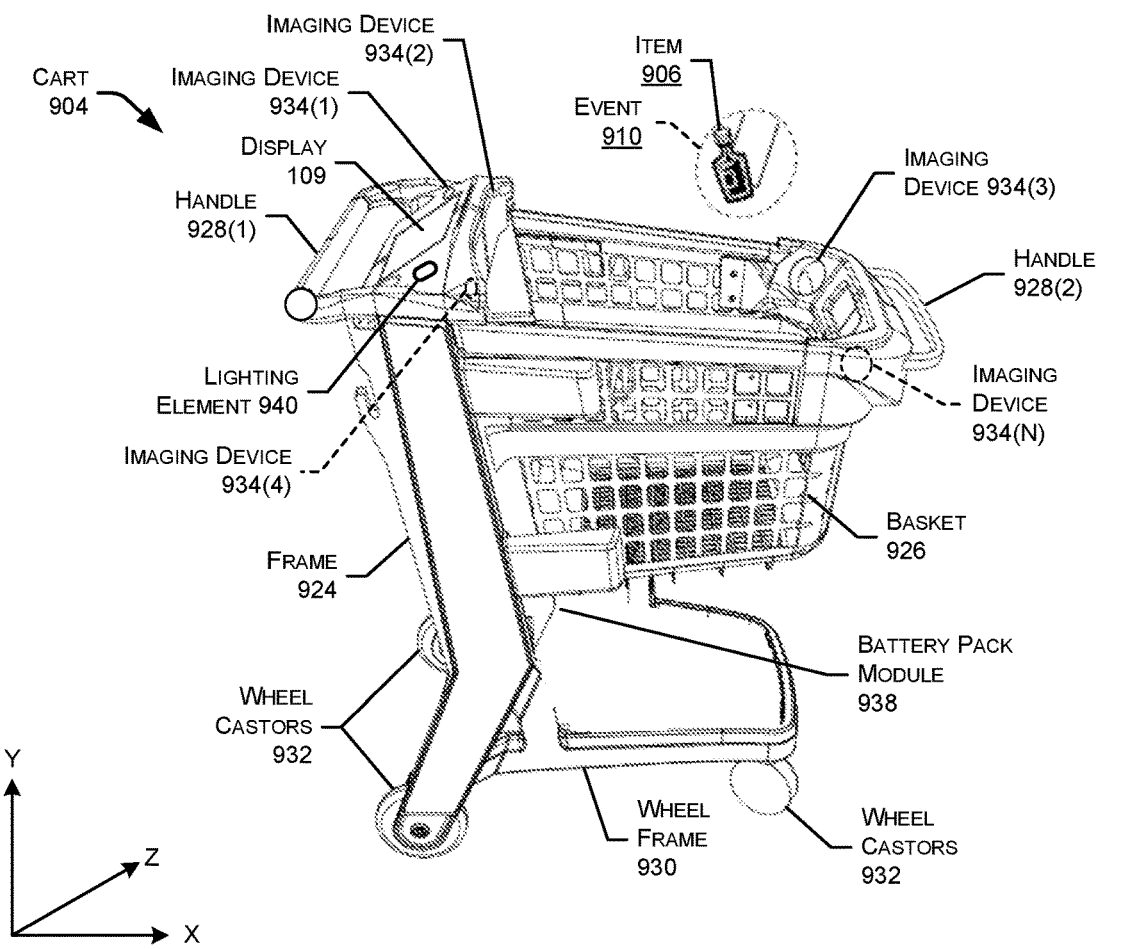
IMAGING DEVICE 934(2)
IMAGING DEVICE 934(1)
DISPLAY 109
HANDLE 928(1)
CART 904
LIGHTING ELEMENT 940
IMAGING DEVICE 934(4)
FRAME 924
WHEEL CASTORS 932
ITEM 906
EVENT 910
IMAGING DEVICE 934(3)
HANDLE 928(2)
IMAGING DEVICE 934(N)
BASKET 926
BATTERY PACK MODULE 938
WHEEL FRAME 930
WHEEL CASTORS 932
Y
Z
X
FIG. 9

SYSTEMS AND METHOD FOR CUSTOMIZED RETAIL ENVIRONMENTS

BACKGROUND

Traditional physical stores maintain an inventory of items in customer-accessible areas such that customers can pick items from the inventory and take them to a cashier for purchase, rental, and so forth. For example, a customer may take an item, such as a shirt, from a rack located within the store. The customer may then take the shirt to a cashier that is located near an entrance of the store. Using a point-of-sale device, the cashier may process a transaction for a price of the shirt. For example, the cashier may input payment information, such as a card number, into the point-of-sale device, which may charge the card of the customer for the price of the shirt.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates a process for implementing AC techniques for customers of facilities, according to at least one example.

FIG. 9 illustrates an example environment of a materials handling facility that includes an item-identifying cart to identify items placed in, and removed from, a basket of the cart by a user. The cart may also be configured to determine its location, determine a nearest item, determine related items, and output recommendation data using the techniques described with reference to FIGS. 1-9.

DETAILED DESCRIPTION

Figure 1:
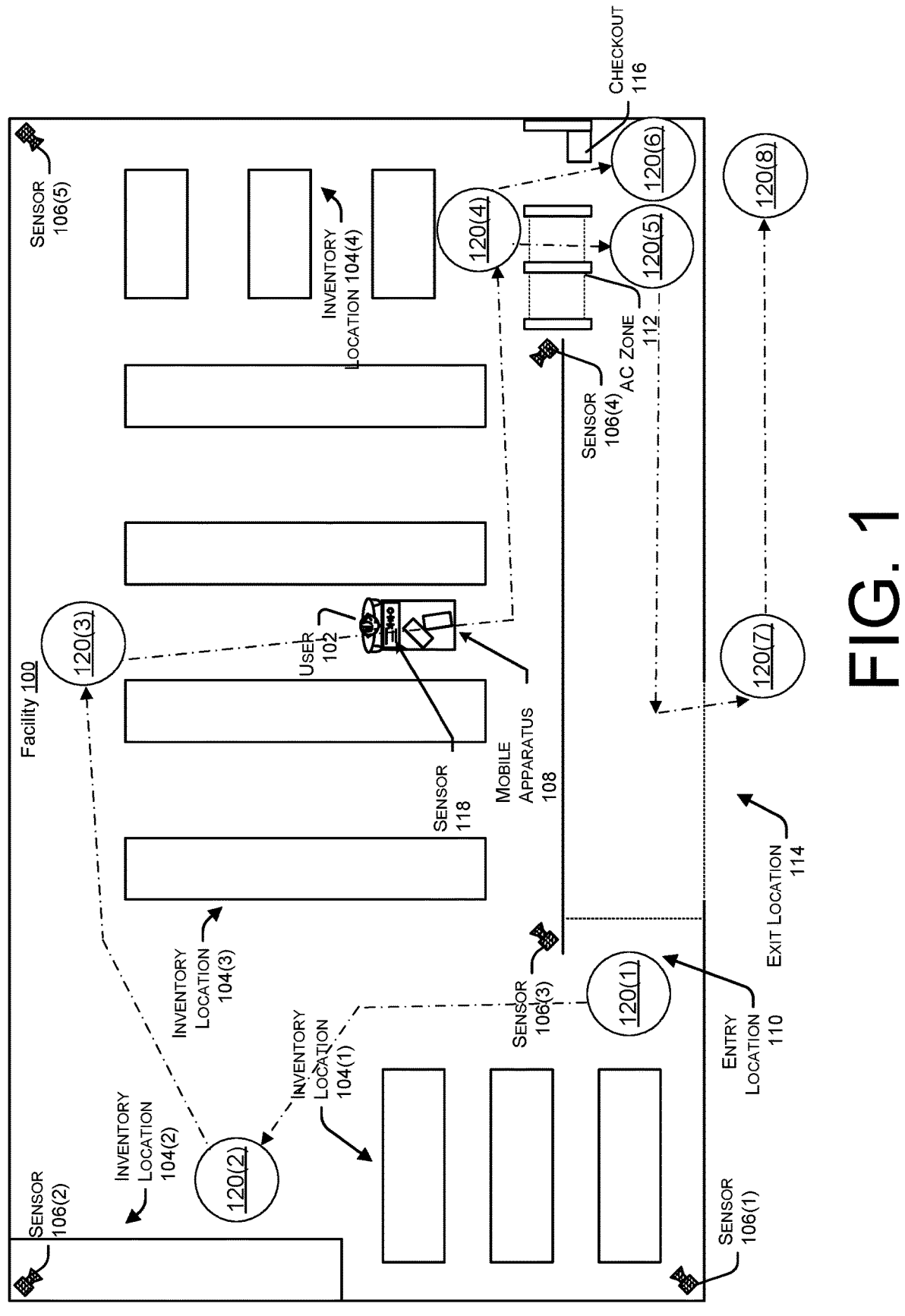
FIG. 1 illustrates an example facility associated with a system for enabling automated checkout (AC) techniques to allow users to enter the facility, remove items that are located at inventory locations within the facility, and exit the facility without performing a manual checkout of the items, according to at least one example.

This disclosure describes, in part, systems for enabling facilities (e.g., physical retail stores) to implement technology that is able to automatically determine items that users possess when exiting facilities. By using this technology, the users are able to pick items from inventory locations (e.g., shelves, racks, cases, cabinets, bins, floor locations, etc.) and exit the facilities without performing manual checkout. For instance, a system may use sensors located within a facility, such as cameras, to determine locations of a user as (and/or after) the user navigates throughout the facility. The system may further use sensors located within the facility, such as signal receivers, to determine locations of an item throughout the facility. The system may then use the locations of the user as well as the locations of the item to determine that the user was in possession of the item while within the facility and/or while exiting the facility. As such, the system may associate an identifier of the item with an account of the user. Additionally, the system may use payment information, which may be stored in association with the account, to automatically process a transaction for the price of the item (e.g., process the transaction without manual checkout).

In particular, this disclosure describes systems for use within the facility that use sensors of the facility as well as mobile apparatuses (such as sensor enabled shopping carts) to increase confidence in items selected by users for purchase as well as to enable other user experiences within the facility. For example, the carts may also provide users with an ability to check prices, monitor a total cost for items in the cart, research products, locate items within the facility, place orders for items (such as items to be prepared e.g., custom weight items for meat products or cooked items), receive notifications, locate items within the facility (e.g., where they are shelved within a store), provide information (e.g., customer ratings or reviews) to aid a user in deciding between products, discover new products, receive personalized discounts while shopping, and receive personalized notifications during their shopping experience.

With the fusion of the facility and the mobile apparatus, the users are able to receive a receipt immediately or within a few minutes of exiting the facility, as compared with the relatively long wait (e.g., several hours) of typical automated checkout systems. The immediate or near immediate receipts enable users to accurately track their spending, return unwanted items with their receipt, or other such tasks. Additionally, the carts provide real-time or near real-time updates to the shopping cart such that the user is able to view, in real-time the subtotal price for their items, and to confirm their purchases, thereby preventing unexpected costs for shopping trips or unintentionally selected items. The users may thereby ensure that their items collectively remain within a desired budget before reaching a checkout stage. In typical systems such live tracking of real-time cart contents and overall price information is not possible to enable such budgeting and cost-tracking by consumers.

The carts enable a user to interact with a shopping companion, such as a digital assistant or electronic device throughout a shopping experience. The companion may be used to access item information such as price, nutrition facts, size information, reviews, recipes, other items frequently purchased together, measurements, and in-store navigation. In this manner, the carts augment the shopping experience by enabling users to directly access such information through the cart based on their selection (e.g., removal from a shelf) of the item, query provided to a voice digital assistant, and/or browsing on a display of the cart.

In some examples, the carts include sensors in addition to sensors associated with the facility, such as cameras, weight sensors, scanners, and other such sensors capable of generating data regarding items selected by users and otherwise interacted with. The combination of facility sensors and cart sensors may be used to increase a confidence level associated with the virtual cart of the user, such that the cart contents may be known with a sufficiently high degree of confidence such that immediate and real-time and/or near real-time cart content tracking is enabled, in addition to immediate checkout as described herein. The confidence score may be increased through the fusion of sensor data from the facility and the cart to determine a probability (e.g., confidence score) that the user is in possession of the item.

The system may then use the probability to determine whether the user was in possession of the item at the time of exiting the facility. In some instances, the system may determine that the user was in possession of the item when the probability satisfies (e.g., is equal to or greater than) a threshold probability (e.g., 98%, 99%, etc.), and determine that the user was not in possession of the item when the probability does not satisfy (e.g., is less than) the threshold probability. For example, and using the example above, the system may determine that the user was in possession of the item when exiting the facility based on the 99.9% probability satisfying a threshold probability of 99%. As will be discussed in more detail below, when the system determines that the user was in possession of the item, the system may store data representing an identifier of the item in association with the account of the user and/or process a transaction for a price of the item.

In some examples, the confidence score and/or probability may be used to direct a user to one or more different exit routes through the facility to complete their shopping experience. In some examples, the confidence score may exceed a first threshold and thereby enable a user to proceed according to an automated checkout system, whereby the user can exit the facility without stopping for a conventional checkout stop. In some examples, the confidence score may be less than the first threshold, in which case the user may be directed to a manual checkout or audit station where the contents of the cart may be reconfirmed. In some examples, the confidence score may be greater than a second threshold, the second threshold being greater than the first threshold. In instances when the confidence score exceeds the second threshold, the system may present a receipt immediately upon determining the user has exited the facility and charge the payment mechanism of the user. In some examples, such as when the confidence score falls between the first and the second threshold, the system may evaluate sensor data and/or event data generated during the shopping trip using one or more systems or algorithms that may process the image data to further increase the confidence score. In such examples, the transaction may not be completed until such additional processing is complete.

The systems and techniques described herein provide for improvements over conventional approaches by enabling increased confidence in virtual cart items selected by a user and thereby enabling real-time evaluation of a price for a collection of items. The real-time price information may be used by individuals to make informed decisions. The systems and techniques described herein further improve on automated checkout systems by enabling further user experiences such as product research and further information regarding items interacted with by the user within the facility. The systems provide for reduced shrink and/or fraud with the AC system by building confidence profiles for each user and/or cart of items. By identifying confidence levels for the items and/or for the user accounts (e.g., such as based on user history, payment mechanism type, and other such user information), the system may identify users who attempt to steal or trick the AC system to avoid paying for the items.

For more detail about the facility, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associated of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (e.g., the system) may communicate with the sensors in order to receive the sensor data.

In addition, the facility may include, in some instances, one or more entry locations for entering the facility and one or more exit locations for exiting the facility. For example, the facility may include an AC entry location at which an entering user provides information for identifying an account of the user. For instance, the AC entry location may include a scanner or other imaging device at which an entering user scans or otherwise provides a unique code associated with the account of the user, such as a code displayed on a mobile device of the user. Or the entry location may include a microphone, camera, or other sensor that generates sensor data at the request of the user for use in identifying the account of the user. In still other instances, the AC entry location may include an input device for reading information from a payment card of a user, such as a credit card, debit card, prepaid card, etc. For example, the AC entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an AC exit location where an exiting user provides information for identifying an account of the exiting user. The AC exit location may include, similar to the AC entry location, a scanner or other imaging device at which the exiting user scans or otherwise provides a unique code associated with the account of the user, such as the code displayed on the mobile device of the user. Or the AC exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location within the facility. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

Within this example facility, if a user enters through an AC entry location and provides information identifying an account of the user, or the user enters the facility and provides information identifying the account of the user at an ordering location, then the system associated with the facility may generate a record indicating the presence of the user at the facility. The record may store an indication of the identity of the user, as well as an indication of whether the user is currently eligible to exit the facility (with items procured by the user) via the AC exit location.

Upon finishing his or her shopping, the user may approach the AC exit location and, in some instances, scan or otherwise provide identifying information to enable the system to identify the exiting user. After scanning his or her unique code at the AC exit location, for instance, the user may exit the facility. The system, meanwhile, may thereafter charge an account of the identified exiting user for a price of the items procured by the user within the facility. Of course, while the above example describes the user scanning a unique code (e.g., via a mobile device of the user), it is to be appreciated that the exiting user may be identified based at least in part on other sensor data, such as image data, voice data, or the like. In some examples, such as described above, the user may be directed to exit by one or more lights, gates, or directional signals at the exit of the facility.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

As described herein, a threshold distance may include, but is not limited to, one meter, two meters, five meters, and/or any other distance. Additionally, a threshold period of time may include, but is not limited to, five minutes, ten minutes, thirty minutes, and/or any other time period.

FIG. 1 illustrates a facility 100 associated with a system for enabling automated checkout (AC) techniques to allow users, such as a user 102, to enter the facility 100, order and/or pick one or more items, and exit the facility without requiring a manual checkout of the items. To do so, the system coupled to the environment may identify the user 102 and charge an account associated with the user 102 for a price of the ordered and/or picked items upon exit of the user 102.

As illustrated in FIG. 1, the facility 100 includes inventory locations 104(1)-(4) (also referred to as "inventory locations 104"). For example, the inventory locations 104(1) and (4) may include racks that hold items (e.g., clothes), the inventory locations 104(2) and (3) may include tables that hold items (e.g., sporting equipment). While these are just a couple examples of inventory locations 104 that may be located within the facility 100, in other examples, the facility 100 may include any number and/or type of inventory locations. In some examples, the inventory locations 104 may include shelving in a grocery store, with tables at inventory location 104(1), refrigerated coolers at inventory location 104(2), shelving at inventory location 104(3), and further shelving at inventory location 104(4).

The facility 100 may also include sensors 106(1)-(5) (also referred to as "sensors 106") located throughout the facility 100. In the example of FIG. 1, the sensors 106 may include cameras. However, in other examples, the sensors 106 may include any other type of sensor, such as microphones, weight sensors, and/or the like. Additionally, in other examples, the facility 100 may include any number of the sensors 106.

Figure 2:
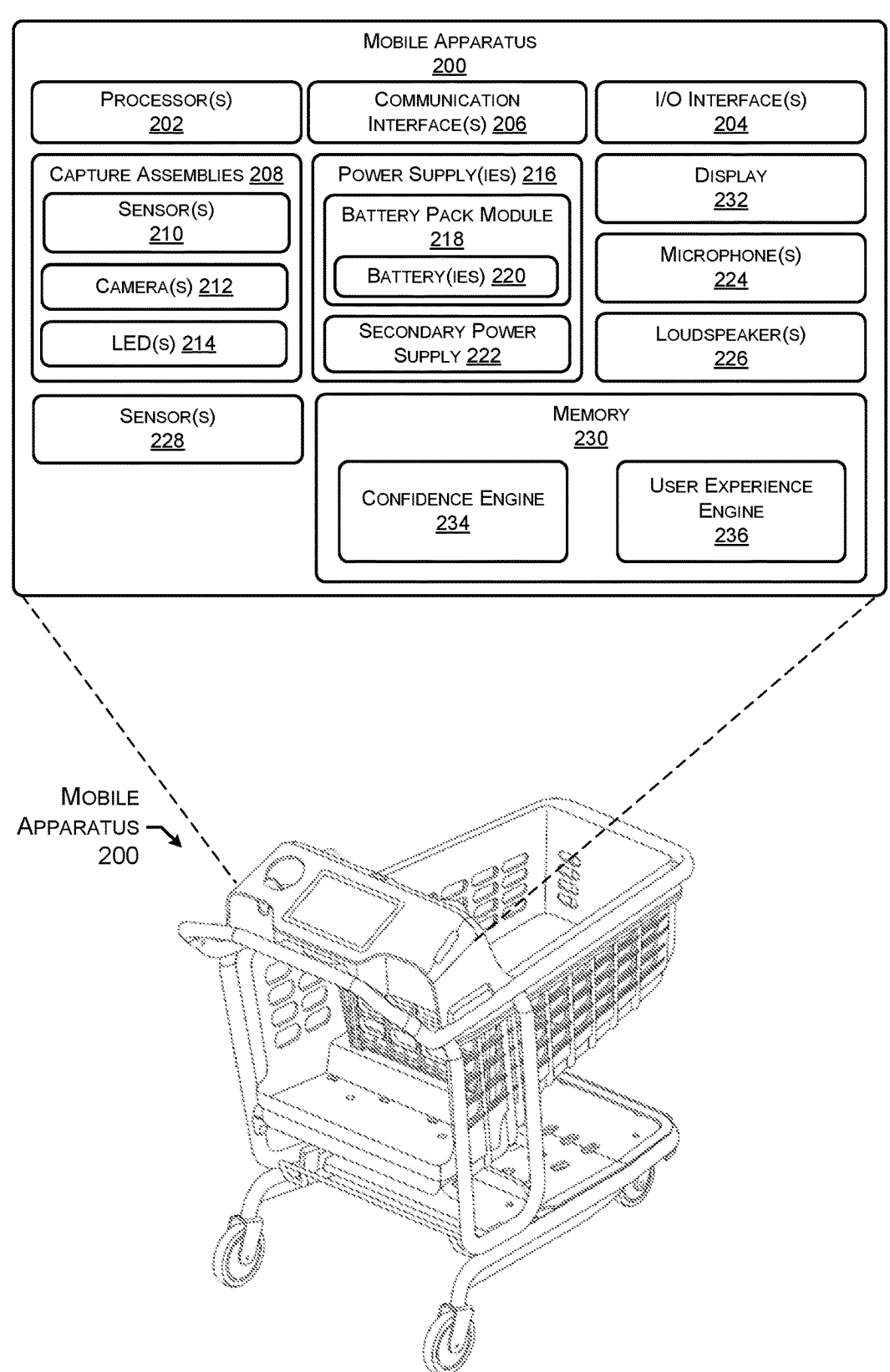
FIG. 2 illustrates an example of components of a user-facing module, according to at least one example.
Figure 10:
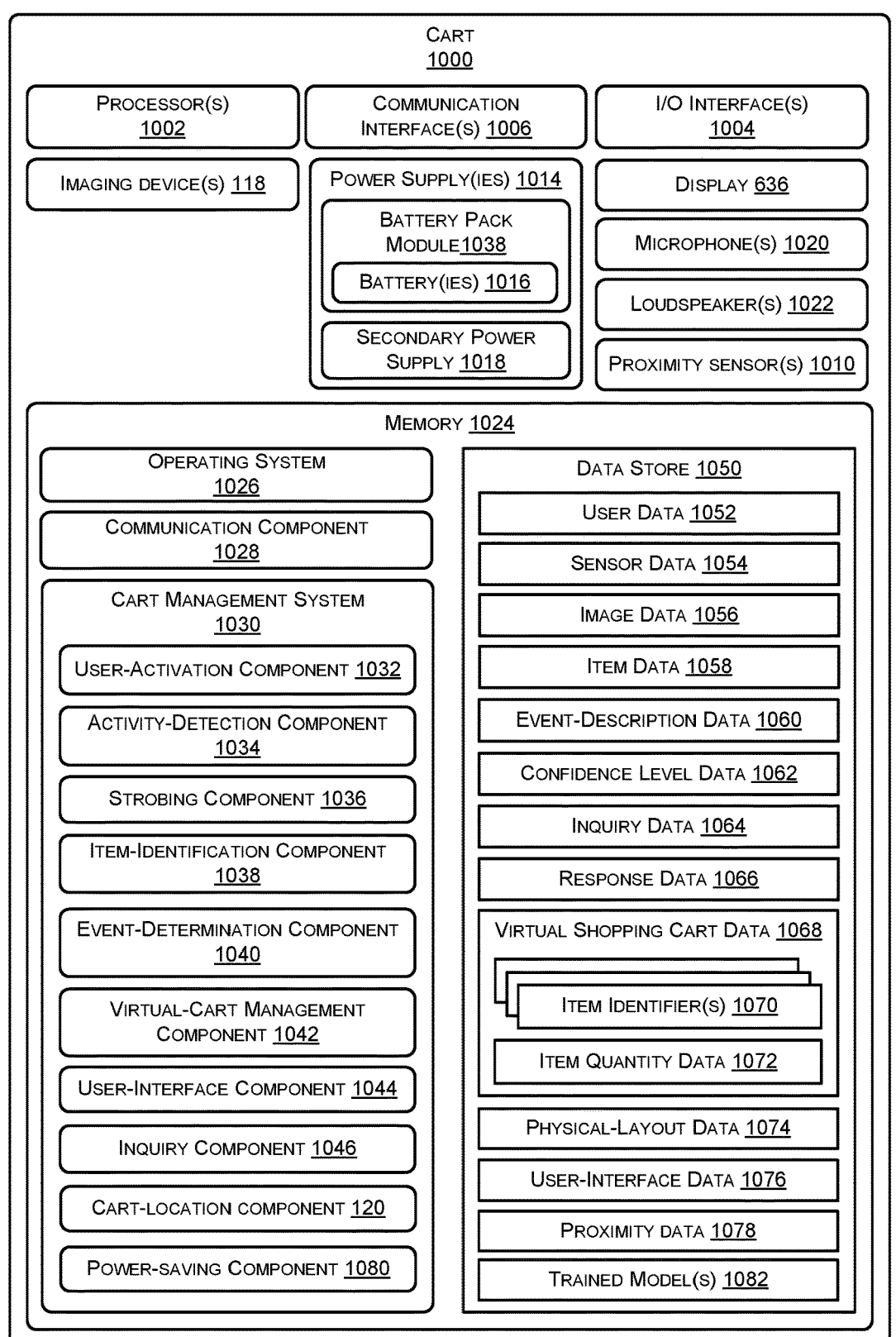
FIG. 10 illustrates example components of a cart configured to support at least a portion of the functionality of a cart management system.

The facility 100 may communicate with a mobile apparatus 108, such as shown and described with respect to FIG. 2 and FIG. 10 herein. The mobile apparatus 108 includes one or more sensors 118 that may generate sensor information regarding items placed within the mobile apparatus 108 and/or in a region surrounding the mobile apparatus 108. The mobile apparatus 108 includes a display and/or other user interfaces for a user to input and receive information regarding items within the facility and/or with respect to the facility.

In the example of FIG. 1, upon the user 102 entering the facility 100 via an entry location 110, the system may generate a record indicating an identifier associated with the user 102. This record may be continuously or periodically updated by a locating component of the system to generate current location data of the user 102 within the facility 100, at the prior consent/request of the user 102. For example, the system may receive, from the sensors 106 (e.g., the sensor 106(1)), sensor data representing the user 102 at a first time $T_1$. The system may then analyze the sensor data to determine that the user 102 was located at a first location within the facility 100 at the first time $T_1$. Additionally, the system may receive, from the sensors 118, sensor data representing an item being placed within the mobile apparatus 108 at the first time $T_1$. The system may then analyze the sensor data from the sensors 106 and/or sensors 118 to determine that the item was selected by the user.

The facility 100 includes an automated checkout (AC) zone 112 and a checkout zone 116 before the user 102 reaches the exit location 114. The AC zone may include one or more lanes or aisles through which a user may be directed to proceed after completing their shopping trip based on their enrollment status with the AC system of the facility 100. The AC zone 112 may include one or more lights, gates, or other indicators to direct a user to proceed through the AC zone 112 based on the enrollment status, the confidence score associated with the virtual cart of the user, the payment mechanism of the user, or other such information.

The checkout zone 116 may include one or more stations for auditing, scanning, or otherwise manually checking the contents of a mobile apparatus 108. The checkout zone may be manned by an associate or may include prompts to cause a user to rescan items within the cart.

The user 102 may proceed through the facility 100 according to an example as described herein. The example may include a user 102 entering through the entry location 110 and enrolling with the AC system. The user may proceed to a first location 120(1), a second location 120(2), a third location 120(3), and one or more other locations as part of their shopping experience within the facility. Upon completing the trip, the user may reach location 120(4) where the system of the facility 100 may direct the user 102 to proceed through the AC zone 112 or the checkout zone 116 based on any or all of the factors described herein.

Upon completing checkout, and reaching locations 120(5) and 120(6), the user may exit the facility at exit location 114 and reach location 120(7) within a first time period after passing through the exit location 114 and/or the AC zone 112. The transaction may be completed within the first time period in response to the confidence in the contents of the mobile apparatus receptacle being above a threshold amount. The first time period may be a time period of five minutes or less and/or may be simultaneous with determining a user has exited the facility. In some examples, such as described herein, the facility 100 may further evaluate sensor data and may complete the transaction for the user 102 after such processing is complete. In some examples, such processing may not be complete until a time period greater than the first time period has elapsed. The difference in when the transaction is completed may be based on the confidence score associated with the items in the user's virtual cart.

FIG. 2 illustrates example components of a mobile apparatus 200, which may be an example of the mobile apparatus 108 of FIG. 1, configured to support at least a portion of the functionality of an item management system. The mobile apparatus 200 may include one or more hardware processors 202 (processors) configured to execute one or more stored instructions. The processor(s) 202 may comprise one or more cores. The mobile apparatus 200 may include one or more input/output (I/O) interface(s) 204 to allow the processor(s) 202 or other portions of the mobile apparatus 200 to communicate with other devices. The I/O interface(s) 204 may comprise Inter-Integrated Circuit (I2C), Serial Peripheral Interface bus (SPI), Universal Serial Bus (USB) as promulgated by the USB Implementers Forum, and so forth. The I/O interface(s) 204 may allow the various modules/components to communicate with each other and/or control each other.

The mobile apparatus 200 may also include one or more communication interfaces 206. The communication interface(s) 206 are configured to provide communications between the mobile apparatus 200 and other devices, such as the server(s), sensors, interface devices, routers, and so forth associated with the facility 100. The communication interface(s) 206 may include devices configured to couple to personal area networks (PANs), wired and wireless local area networks (LANs), wired and wireless wide area networks (WANs), and so forth. For example, the communication interfaces 206 may include devices compatible with Ethernet, Wi-Fi™, and so forth. The mobile apparatus 200 may also include one or more busses or other internal communications hardware or software that allow for the transfer of data between the various modules and components of the mobile apparatus 200.

The mobile apparatus 200 may also include the one or more capture assemblies 208 that each include one or more sensors 210, a camera 212, and one or more LEDs 214. In some examples, the sensor(s) 210 may comprise any type of sensor that is able to detect the presence of nearby objects without the need for physical contact (e.g., ToF sensor(s), PIR sensor(s), capacitive sensor(s), etc.). The cameras 212 in each of the capture assemblies 208 may comprise any type of camera or imaging device configured to generate image data (and/or video data), or information descriptive of a plurality of picture elements or pixels. The LED(s) 214 may be selectively activated to emit light at any wavelength, visible or non-visible to users. In some examples, one or more capture assemblies 208 may additionally, or alternatively, be facing downward into the basket or receptable of the mobile apparatus 200. Additionally, the mobile apparatus 200 may include one or more cameras 212 that are outward facing in that generate image data representing the facility around the mobile apparatus 200.

The mobile apparatus 200 may include one or more power supply(ies) 216 to provide power to the components of the mobile apparatus 200, such as a battery pack module 218 (e.g., the battery), which include one or more batteries 220. The power supply(ies) 216 may also include a secondary (e.g., internal) power supply 222 to allow for hot swapping of battery pack modules 218, such as one or more capacitors, internal batteries, etc.

The mobile apparatus 200 may also include a display 232 configured to display content represented by image data, such as pictures, videos, user interface elements, and/or any other image data. The display 232 may comprise any type of display 232, and may further be a touch screen to receive touch input from a user. The mobile apparatus 200 may also include one or more microphones 224 and one or more loudspeaker(s) 226 to facilitate a dialogue with a user, and/or to receive feedback from the user. The microphone(s) 224 may capture sound representing the user's speech, and the loudspeaker(s) 226 may output machine-generated words to facilitate a dialogue, prompt a user for feedback on an item and/or for other information, and/or output other alerts or notifications.

The mobile apparatus 200 may also include other types of sensor(s) 228. As described herein, these sensor(s) may proximity sensor(s), light sensor(s), and/or the like.

The mobile apparatus 200 may include one or more memories 230 (e.g., in an electronics box module along with the processor(s) 202). The memory 230 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 230 provides storage of computer-readable instructions, data structures, program modules, and other data for the operation of the mobile apparatus 200.

The mobile apparatus 200 may include a confidence engine 234 and a user experience engine 236 as part of the memory 230. The confidence engine 234 may include one or more systems, techniques, algorithms, models, or other such information that may be used to determine a confidence score associated with item interactions detected by the mobile apparatus 200 and/or the facility 100. The user experience engine 236 may be configured to provide user interactions and experiences such as item research, recommendations, guidance, shopping list information, virtual cart information, and other such information to the user through the display 232. The user experience engine 236 may be configured to interface with one or more digital assistants to provide user interactions and information regarding the facility and/or the items.

The user experience engine 236 may enable a user to interact with a shopping companion, such as a digital assistant or electronic device throughout a shopping experience. The companion may be used to access item information such as price, nutrition facts, size information, reviews, recipes, other items frequently purchased together, measurements, and in-store navigation. In this manner, the carts augment the shopping experience by enabling users to directly access such information through the cart based on their selection (e.g., removal from a shelf) of the item, query provided to a voice digital assistant, and/or browsing on a display of the cart.

The confidence engine 234 may be used to determine a confidence level associated with the virtual cart of the user, such that the cart contents may be known with a sufficiently high degree of confidence such that immediate and real-time and/or near real-time cart content tracking is enabled, in addition to immediate checkout as described herein. The confidence score may be increased through the fusion of sensor data from the facility and the cart to determine a probability (e.g., confidence score) that the user is in possession of the item.

The system (e.g., the servers associated with the facility 100) may then use the probability to determine whether the user was in possession of the item at the time of exiting the facility. In some instances, the system may determine that the user was in possession of the item when the probability satisfies (e.g., is equal to or greater than) a threshold probability (e.g., 98%, 99%, etc.), and determine that the user was not in possession of the item when the probability does not satisfy (e.g., is less than) the threshold probability. For example, and using the example above, the system may determine that the user was in possession of the item when exiting the facility based on the 99.9% probability satisfying a threshold probability of 99%. As will be discussed in more detail below, when the system determines that the user was in possession of the item, the system may store data representing an identifier of the item in association with the account of the user and/or process a transaction for a price of the item.

In some examples, the confidence score and/or probability may be used to direct a user to one or more different exit routes through the facility to complete their shopping experience. In some examples, the confidence score may exceed a first threshold and thereby enable a user to proceed according to an automated checkout system, whereby the user can exit the facility without stopping for a conventional checkout stop. In some examples, the confidence score may be less than the first threshold, in which case the user may be directed to a manual checkout or audit station where the contents of the cart may be reconfirmed. In some examples, the confidence score may be greater than a second threshold, the second threshold being greater than the first threshold. In instances when the confidence score exceeds the second threshold, the system may present a receipt immediately upon determining the user has exited the facility and charge the payment mechanism of the user. In some examples, such as when the confidence score falls between the first and the second threshold, the system may evaluate sensor data and/or event data generated during the shopping trip using one or more systems or algorithms that may process the image data to further increase the confidence score. In such examples, the transaction may not be completed until such additional processing is complete.

In particular, the user experience engine 236 may be used to enable a user with an ability to check prices, monitor a total cost for items in the cart, research products, locate items within the facility, place orders for items (such as items to be prepared e.g., custom weight items for meat products or cooked items), receive notifications, and receive personalized notifications during their shopping experience.

Figure 3:
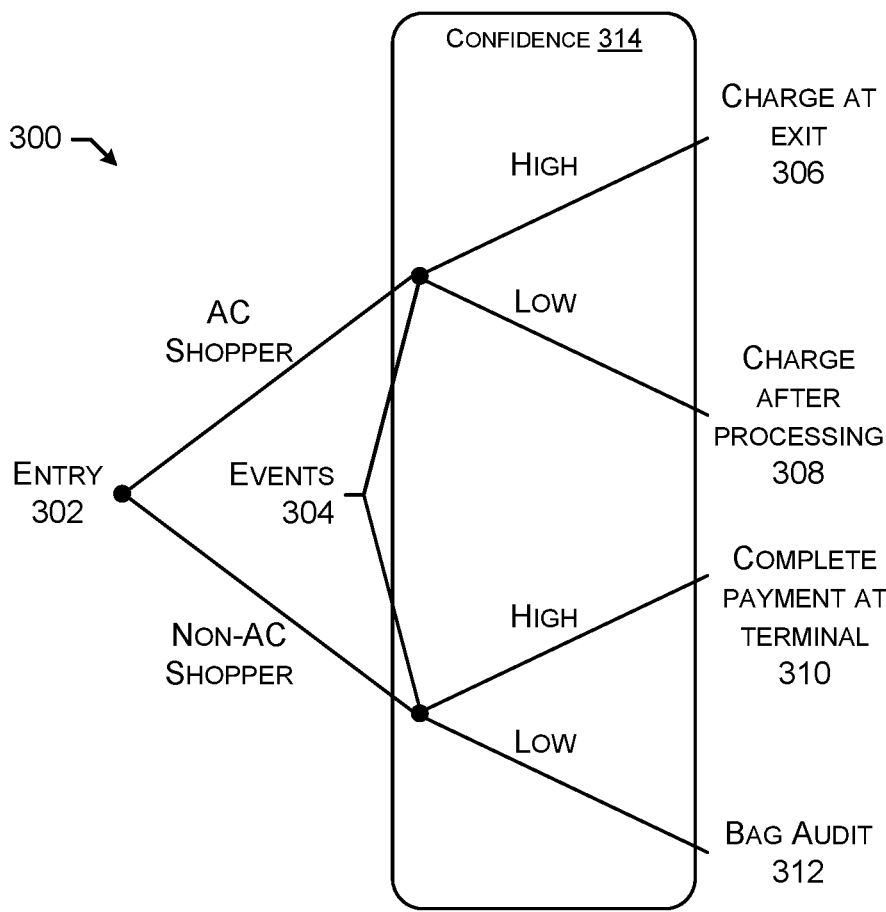
FIG. 3 illustrates an example decision tree depicting confidence score thresholds for different checkout processes, according to at least one example.

FIG. 3 illustrates a decision tree 300 depicting confidence score thresholds for different checkout processes, according to at least one example. In the decision tree 300, at entry 302, a user enters the facility 100. Initially, at entry 302, the user may scan a QR code, credit card linked to an account, provide personal identifying information, or otherwise identify a unique user account. As the user proceeds through the facility 100, the sensors within the facility and/or sensors within the mobile apparatus may be used to determine item interactions and associated confidence scores. The confidence scores may be used to determine how the user proceeds through the facility 100 and completes their transaction.

At entry 302, the user may be identified as having an automated checkout account, or starting an automated checkout session. In some facilities, the user may be able to proceed through the facility 100 without completing an automated checkout authorization or enrollment. Throughout the facility 100, events 304 may be determined based on sensor data generated by the sensors 106 and sensors 118. Confidence scores 314 may be determined for each of the events 304 based on the confidence associated with the events 304, such as a confidence that the events 304 comprise an item selection.

When the system associated with the facility 100 has high confidence, such as above a threshold level (e.g., 90%) then the system may charge the user account upon the user reaching the exit according to checkout 306. In some examples, such as when the confidence is below a threshold (e.g., 75% or less, e.g., in a range of 60% to 75%) then the user may be directed to proceed through the exit and the system may continue to process sensor data and events at 308, resulting in delays to the transaction completion. In some examples, such as when the confidence is below a lower threshold (e.g., less than 60%), then the user may be directed to a manual checkout station and/or to a manual audit by an associate.

In some examples, the non-automated checkout user may have similar confidence profiles for events 304 and may similarly be directed to different checkout procedures based on the confidence profiles. For example, at 310, when the system has high confidence in the contents of the mobile apparatus, the user may complete payment at a terminal without rescanning any items. In some examples, such as at 312, the user may proceed through a manual checkout procedure and/or bag audit where items may be rescanned, either by the user or by an associate before completing the transaction.

Figure 4:
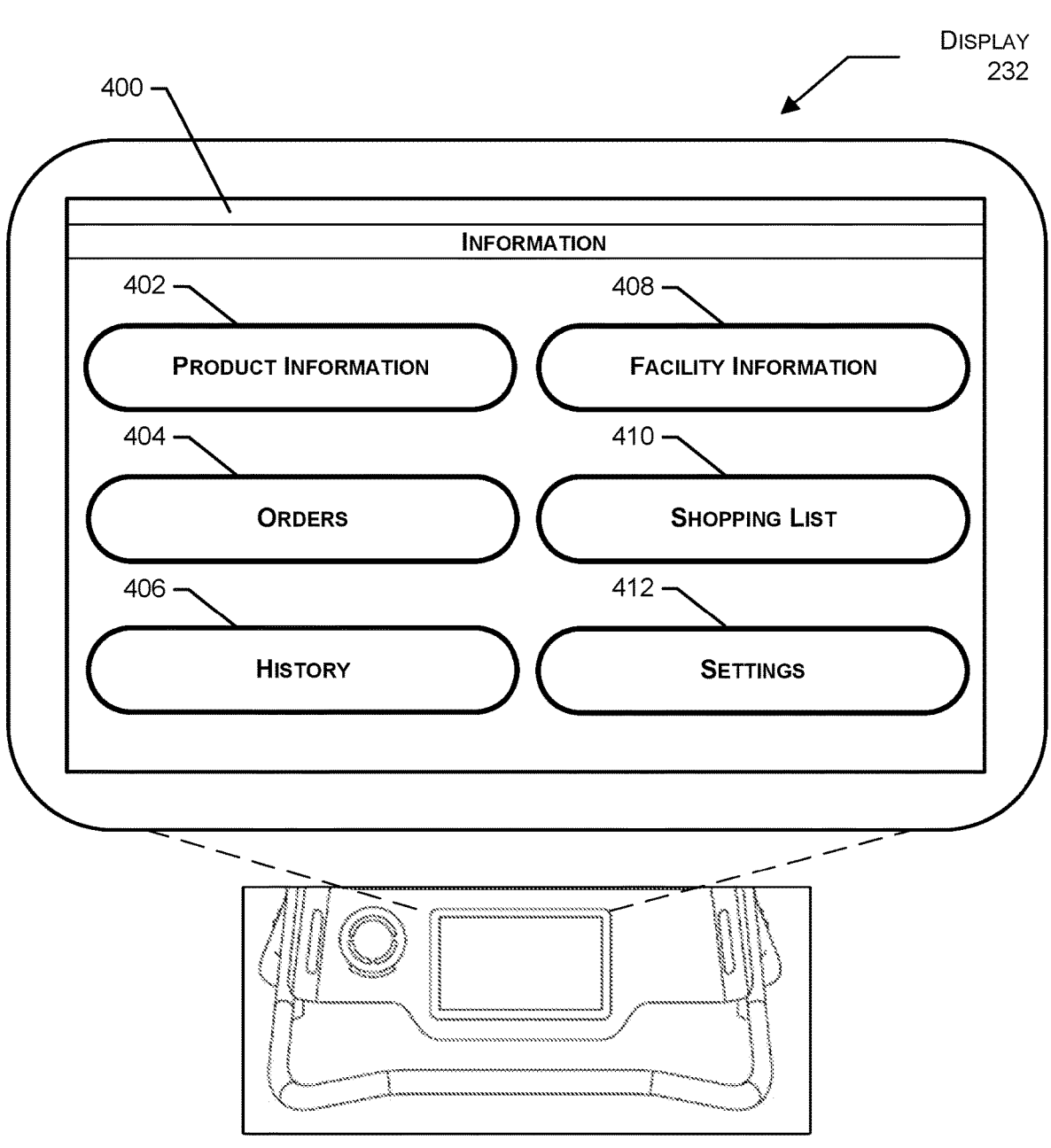
FIG. 4 illustrates an example user interface of a user-facing module showing user interaction options, according to at least one example.
Figure 5:
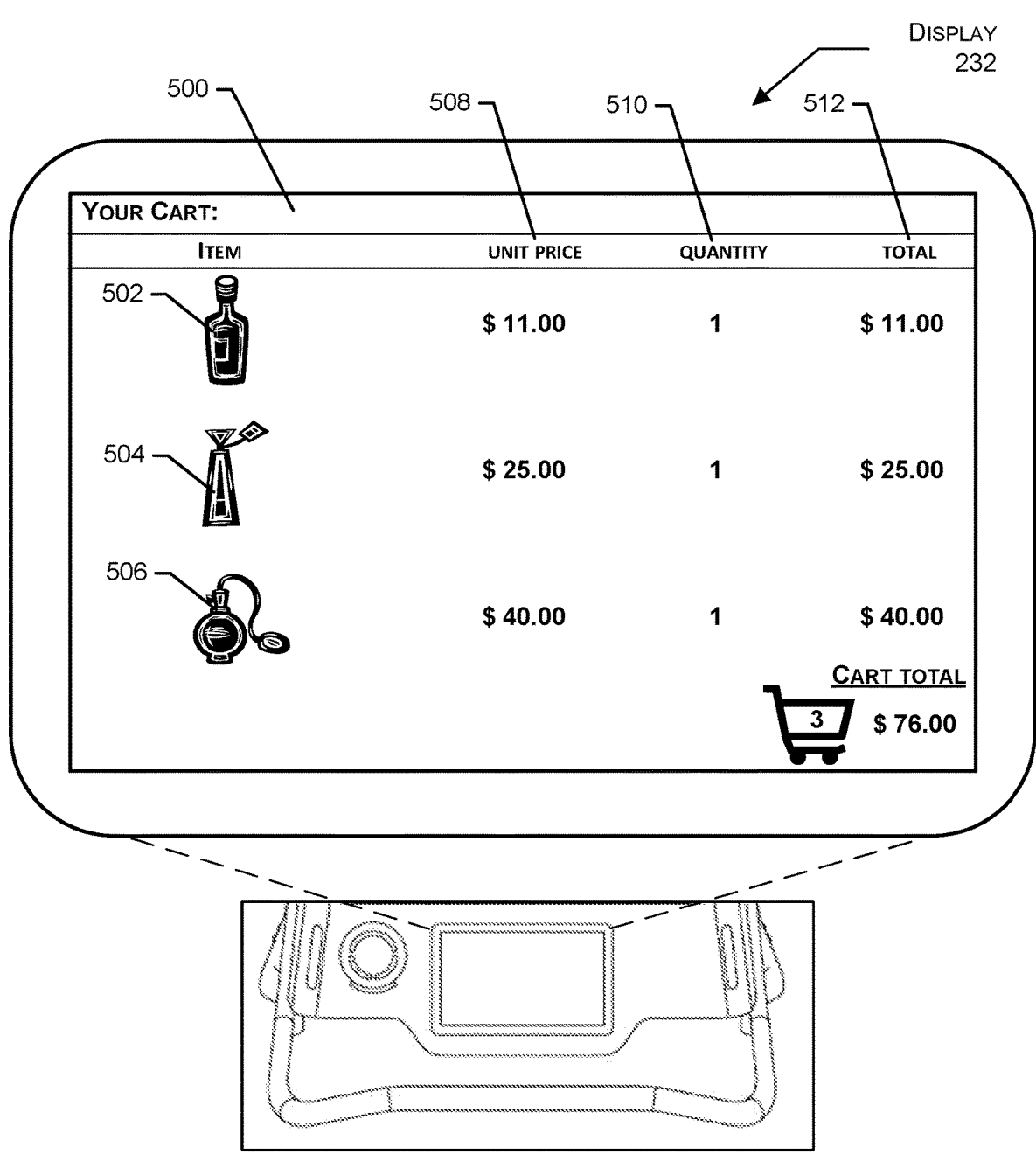
FIG. 5 illustrates an example user interface of a user-facing module showing a real-time listing of items and associated prices in a virtual cart, according to at least one example.
Figure 6:
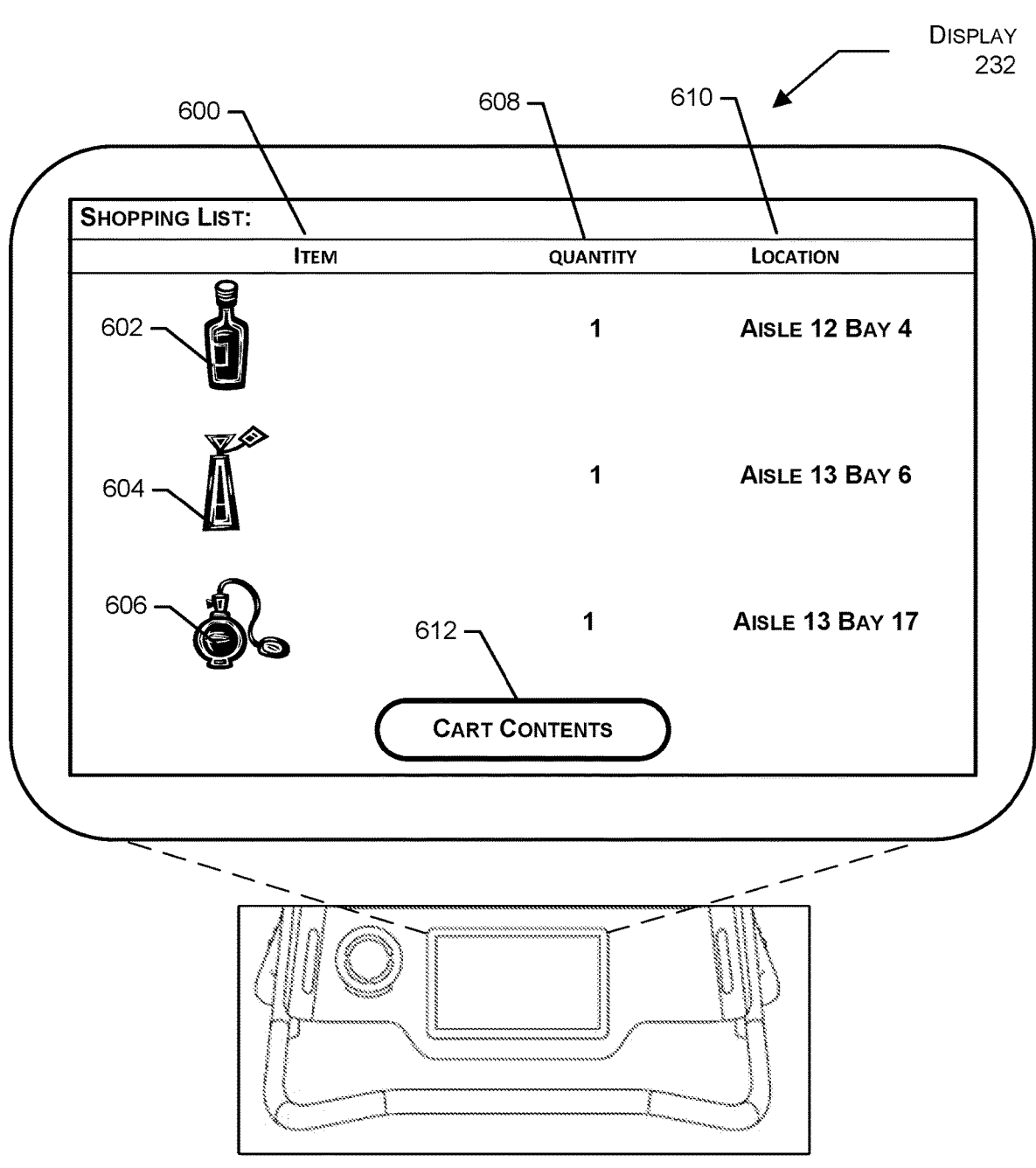
FIG. 6 illustrates an example user interface of a user-facing module showing a shopping list of a user with associated facility locations, according to at least one example.

FIGS. 4-6 illustrate example user interfaces of a user-facing module, such as the display 232 of the mobile apparatus 200 in different implementations and or examples to provide additional user experiences, such as described with respect to the user experience engine 236.

FIG. 4 illustrates a user interface 400 of a user-facing module showing user interaction options, according to at least one example. The user interface 400 includes information that may enable a user to identify product information 402, place orders or view a status of orders with the orders 404, view a purchase and/or shopping history at history 406, view facility information 408, view a stored shopping list 410, and view one or more settings 412. For example, the user interface 400 may provide users with an ability to check prices, view detailed product information, reviews, research products, locate items within the facility, place orders for items (such as items to be prepared e.g., custom weight items for meat products or cooked items), receive notifications, view tracking history, purchase history, view a shipping list, and receive personalized notifications during their shopping experience.

FIG. 5 illustrates a user interface 500 of a user-facing module showing a real-time listing of items and associated prices in a virtual cart, according to at least one example. The user interface 500 includes items 502, 504 and, 506 that may be identified as having been placed in the cart. The user interface 500 may also identify unit prices 508, quantities 510, and total prices 512 for the cart. The user interface 500 may provide real-time or near real-time updates to the shopping cart such that the user is able to view, in real-time the subtotal price for their items, and to confirm their purchases, thereby preventing unexpected costs for shopping trips or unintentionally selected items. The users may thereby ensure that their items collectively remain within a desired budget before reaching a checkout stage. In typical systems such live tracking of real-time cart contents and overall price information is not possible to enable such budgeting and cost-tracking by consumers.

The updates to the user interface 500 may be based on the confidence score associated with particular events, such as selecting items. The updates may be reflected when the associated confidence score is above a threshold. In some examples all updates may be reflected regardless of confidence score. The real-time tracking of the prices for the virtual cart may enable the user to accurately identify a cost of items prior to purchase, as described herein.

FIG. 6 illustrates a user interface 600 of a user-facing module showing a shopping list of a user with associated facility locations, according to at least one example. The user interface 600 may include items 602, 604, and 606 placed on a shopping list by a user associated with the account used for the checkout system. The user interface 600 may include a quantity 608 and location 610 for the items on the shopping list. The user interface 600 also include a button to switch to a real-time view of the listing of items in the cart.

In some examples, the user interface 600 may identify items in proximity to the mobile apparatus based on the location of the mobile apparatus within the facility 100. In an example, the user may generate a shopping list of items. The shopping list may identify a type, brand, or other item identifier. The shopping list may be compared, by the system, against a planogram of the facility 100 to identify locations for the items included on the list. As the mobile apparatus 108 is moved through the facility 100, the system (e.g., the facility server and/or the mobile apparatus 108) may determine the location of the mobile apparatus 108 and may identify items on the shopping list within a threshold distance of the cart. In some examples, items may be identified based on their proximity to the location. After identifying the items, the user interface 600 may indicate a location for the items and in some examples may provide directions to travel to the locations of the items.

Figure 7:
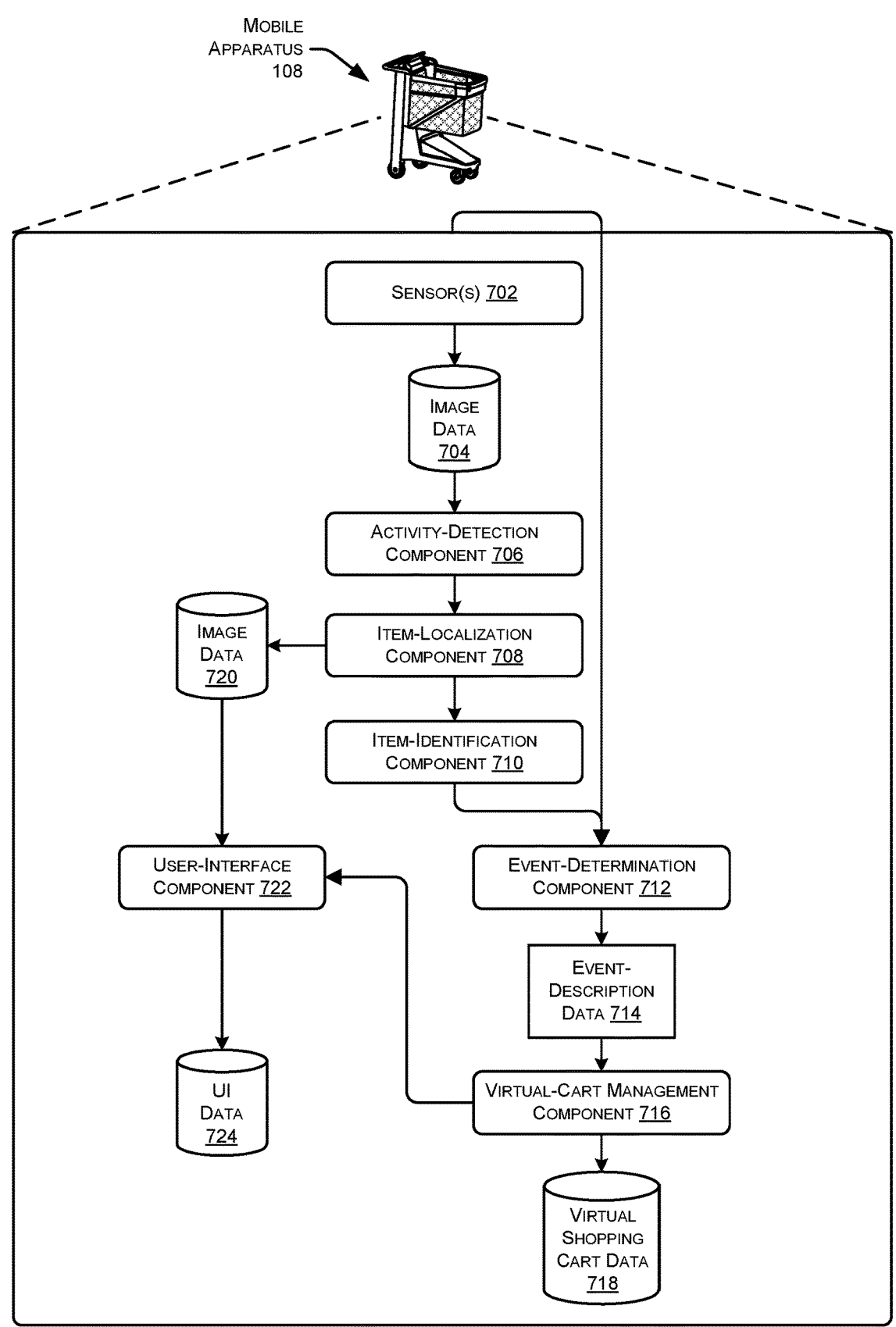
FIG. 7 illustrates example components of an item-identifying cart for determining respective results of events involving items placed into, or removed from the cart, and components for generating image data and UIs that include a portion of the image data, according to at least one example.

FIG. 7 illustrates example components of an item-identifying cart, such as the mobile apparatus 108 for determining respective results of events involving items placed into, or removed from the cart, and components for generating image data and UIs that include a portion of the image data. It is to be appreciated that while FIG. 7 describes these components as residing on the mobile apparatus 108, it is to be appreciate some or all of these components may additionally or alternatively reside on one or more devices, such as servers within a facility 100, servers that are remote from the facility, and/or the like. Further, FIG. 10 illustrates and describes additional potential components below.

As illustrated, the mobile apparatus 108 may include sensors 702 (e.g., cameras). The sensors 702 may generate image data 704, which may represent items being placed into and/or removed from the mobile apparatus 108. In general, this image data 704 may be used to identify items and determine events involving the items, in order to maintain an accurate virtual cart of the user.

As illustrated, an activity-detection component 706 may receive and analyze the image data 704 to determine whether the image data represents any activity. For example, the activity-detection component 706 may comprise one or more trained classifiers configured to detect whether the image data 704 represents any predefined activity within an airspace of the basket of the mobile apparatus 108 (e.g., a user's hand, an item, etc.). If there are no pending events to resolve and the activity-detection component 706 does not detect activity, then the activity-detection component 706 may set its flag to false and no further processing may occur for the time being. If, however, there is no unresolved events and the activity-detection component 706 detects activity (e.g., by setting its flag to true), then the mobile apparatus 108 may begin a process for identifying one or more items from the image data. In addition, upon the activity-detection component 706 setting its flag back to false, the mobile apparatus 108 may begin attempting to determine the outcome of the event involving any identified items. The activity-detection component 706 may also determine a confidence score associated with item determinations.

Upon the activity-detection component 706 detecting activity, an item-localization component 708 may analyze the image data 704 to identify, on a frame-by-frame basis, whether the respective frame includes one or more portions that include an item. The item-localization component 708 may determine a confidence score associated with each item identified. In some instances, the item-localization component 708 may comprise one or more trained localizers that receive, as input, a frame of image data and, if the localizer(s) detect an item, outputs an indication of a portion (e.g., coordinates of a bounding box) of the frame that includes an item, along with a confidence level that this portion includes an item. In some instances, the trained localizer(s) may output multiple portions and respective confidence levels. Further, FIG. 7 indicates that in some instances, the activity-detection component 706 may send an indication to the event-determination component 712 in response to detecting activity (or a lack thereof). In some of these instances, the event-determination component 712 may begin analysis of the inputs it has received, regardless of whether the item-identification component has provided an input comprising the identity associated with an item in the image data. For example, if a user places their hand in the cart, without an item, the activity-detection component 706 may detect this activity and notify the event-determination component 712, while the item-identification component 710 would not identify an item (given that there is no item in the image data in this example).

After the item-localization component 708 identifies portions of the frames of the image data 704 that includes items, an item-identification component 710 may attempt to identify the item(s) from these portions. For example, the item-identification component 710 may comprise one or more trained classifiers that receive, as input, the portions of the frame identified by the item-localization component 708 and attempt to determine an item identifier associated with each respective item. The trained classifiers of the item-identification component 710 may identify the items based on identifying text of the items, barcodes of the items, and/or the like. The item identifiers output by the item-identification component 710 may also be associated with respective confidence values, as determined by the classifier(s). These item identifiers and corresponding confidence values may be provided to an event-determination component 712, which may attempt to determine the outcome(s) of any event(s) involving these items, as described below. In some instances, the item-identification component 710 provides, to the event-determination component 712, an indication that the item-identification component 710 was unable to identify the item(s).

In some instances, the event-determination component 712 may determine the outcome of events by generating respective scores for different possible outcomes of a given series of events. To provide an example, the event-determination component 712 may receive an indication of one or more items identified since the last update to the virtual shopping cart data and the change in weight of the basket of the cart since the last update. In addition, the event-determination component 712 may receive, or may determine, a weight associated with each of the identified items. For example, the event-determination component 712, or another component, may access catalog data using an identifier of each of the identified items to determine a catalog weight associated with each respective item. With this information, the event-determination component 712 may generate one or more hypotheses of how to explain the change in weight of the basket given the identified items (and their catalog weights). In some instances, each hypothesis may indicate an action take with respect to an identified item (e.g., take or return) and a count of each respective item (e.g., zero, one, two, etc.).

In some instances, the event-determination component 712 may determine that a determined hypothesis is associated with a confidence score that is greater than a threshold score and, thus, the virtual shopping cart data may be updated according to this hypothesis. In other instances, the event-determination component 712 might not determine a hypothesis that is greater than the threshold score and, thus, an alarm (e.g., visual, audible, etc.) or other feedback may be output to the user. For example, a lighting element of the cart may be illuminated orange, red, or the like, a display on the cart may indicate that no outcome was determined, or the like. In still other instances, the event-determination component 712 may determine multiple hypotheses that are associated with respective confidence scores that are each greater than the threshold value. In these instances, the cart may output a request to the user for assistance. For example, the cart may output on a display or other output device a request to indicate which of the determined hypotheses corresponds to the actual event performed by the user. Upon receiving input from the user, the cart may update the virtual shopping cart data accordingly.

In some instances, meanwhile, the event-determination component 712 may use the techniques described herein, prior to generating event-description 714. In some examples, the event-determination component 712 may generate the event-description data 714 corresponding the potential result associated with a highest likelihood or score. Again, after generating the event-description data 714, the virtual-cart management component 716 may update the virtual shopping cart data 718 accordingly.

Returning to the item-localization component 708, however, after identifying respective portions of the frames of the image data that include an item, the item-localization component 708 may determine whether to store these portions as image data 720, which may comprise storing these portions in volatile memory having a limited, defined size such that older data is deleted upon newer data being stored.

In some instances, the item-localization component 708 may determine whether to store these portions of the frames of the image data 704 as image data 720 if the portions meet one or more predefined criteria. For example, as noted above, the localizer(s) of the item-localization component 708 may output a confidence level that a respective portion of a frame (e.g., a bounding box of a frame of image data) represents an item. The item-localization component 708 may determine whether a confidence value associated with a portion of a frame is greater than a threshold confidence value (e.g., 0.65, 0.95, etc.). If not, then the item-localization component 708 may refrain from storing the portion of the frame as image data 720. In addition, or in the alternative, the item-localization component 708 may also determine whether a size of the portion of the frame meets one or more size criteria. For example, the item-localization component 708 may determine whether the size of the portion is less than a threshold size, greater than a threshold size, or the like. If the portion does not meet the size criteria, then the item-localization component 708 may refrain from storing the portion of the frame as the image data 720. In addition, or in the alternative, the item-localization component 708 may determine whether a threshold amount of time has elapsed since last storing a portion of a frame as image data 720, in order to avoid duplicative frames and in order to lessen computational processing. If the threshold amount of time has not elapsed, then the item-localization component 708 may refrain from storing the portion of the frame as image data 720. If, however, a portion of a frame meets one or more (e.g., each) of the criteria, then the item-localization component 708 may store the portion of the frame as the image data 720. In some instances, the item-localization component 708 stores each frame in association with a timestamp representing the time at which the respective frame was generated, analyzed, processed, and/or the like.

Returning to the event-determination component 712, in some instances this component may be unable to determine the outcome of an event with a threshold amount of confidence. In these instances, the event-determination component 712 may output an indication of an error, which the event-determination component 712 may output in the form of event-description data 714. The virtual-cart management component may receive this error and may provide an indication of the error to a user-interface (UI) component 722. In instances where the item-identification component 710 identified the item involved in the event, the event-determination component may also output this information as event-description data 714, which may also be later received at the UI component 722. In response, the UI component 722 may acquire an image (e.g., from an item catalog, online, etc.) associated with the identified image and may generate and output UI data 724 for presentation to the user of the mobile apparatus 108. The UI generated using the UI data 724 may include the image of the item, an indication of the error, and a request that the user aid in helping the mobile apparatus 108 determine the outcome of the event involving the identified item.

In some instances, however, the item-identification component 708 may fail to identify the item. In these instances, the event-determination component 712 may output this indication, which may be received by the UI component 722. In response, the UI component 722 may acquire one or more frames from the image data 720 (e.g., from the volatile memory). For example, the event-determination component 712 may output an indication that an outcome associated with an event that is associated with a time or time range has not been determined, and that the item is unidentified. The UI component may analyze each portion of each frame associated with a timestamp that is within the determined time range (or within a threshold amount of time of a given time of the event) to determine the portion of the frame associated with a highest confidence value. That is, if the unresolved event is associated with a time range of one second, the UI component 722 may analyze the image data 720 to determine, from the frames stored in the image data 720 having respective timestamps that occur within the defined one-second time range, the portion of the frame (or a number of portions of frames) having the highest confidence level, which indicates it is most likely to depict an item.

The UI component may then retrieve that portion of the frame from the image data 720 and generate UI data 724 including the retrieved portion of the frame. For example, the UI component 722 may generate UI data 724 that includes the retrieved image data 720, an indication that the mobile apparatus 108 was unable to identify the item, and selectable controls to enable the user to help the mobile apparatus 108 identify the item.

FIG. 8 illustrates a process for implementing AC techniques for customers of facilities. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

At 802, the process 800 includes determining a first user interaction with an item within a facility. The first user interaction may be determined based on one or more sensors within the facility 100. The first user interaction may include the user selecting an item from a shelf of the facility 100. In some examples, the first user interaction may be determined based on a combination of signals from sensors within the facility. The interaction may include an interaction type as well as an item identification.

At 804, the process 800 includes determining a first confidence score associated with the first user interaction. The first confidence score may be associated with the item identification and/or the interaction type, such as whether the item is picked up and replaced or returned to the shelf. In some examples, the first confidence score may be based on inputting the sensor data into one or more models or algorithms.

At 806, the process 800 includes determining a second interaction. The second interaction may include an interaction involving a user and a cart. The second interaction may include placing the item in a receptacle of the cart. The second interaction may be based on data from the cart sensors and/or from sensors of the facility.

At 808, the process 800 includes determining a second confidence score. The second confidence score may be determined based on the item identity, sensor data from the facility, sensor data from the cart, user information, payment instrument type (e.g., credit card, debit card, cash, etc.), and other such information.

At 810, the process 800 includes updating a virtual cart associated with a user operating the mobile apparatus to indicate addition of the item. The virtual cart may be updated in real-time and displayed at a display of the cart. The virtual cart may be updated based on the second confidence score, for example by updating the virtual cart in response to the second confidence score being greater than a threshold.

At 812, the process 800 includes determining to charge a payment instrument associated with the virtual cart. In some examples, the confidence score and/or probability may be used to direct a user to one or more different exit routes through the facility to complete their shopping experience. In some examples, the confidence score may exceed a first threshold and thereby enable a user to proceed according to an automated checkout system, whereby the user can exit the facility without stopping for a conventional checkout stop. In some examples, the confidence score may be less than the first threshold, in which case the user may be directed to a manual checkout or audit station where the contents of the cart may be reconfirmed. In some examples, the confidence score may be greater than a second threshold, the second threshold being greater than the first threshold. In instances when the confidence score exceeds the second threshold, the system may present a receipt immediately upon determining the user has exited the facility and charge the payment mechanism of the user. In some examples, such as when the confidence score falls between the first and the second threshold, the system may evaluate sensor data and/or event data generated during the shopping trip using one or more systems or algorithms that may process the image data to further increase the confidence score. In such examples, the transaction may not be completed until such additional processing is complete.

FIG. 9 illustrates an example environment 900 of a materials handling facility 902 that includes an item-identifying cart 904 to identify items 906 placed in, and removed from, a basket of the cart 904 by an example user 908. In some instances, the cart 904 corresponds to the mobile apparatus 108 described above. In addition to identifying and analyzing image data for determining a location of the cart, the cart 904 may generate first image data for identifying a user and generate second image data depicting the item 906. In addition, the cart may analyze the second image data to identify an item identifier for the item 906, determine the event 910 involving the item (e.g., add to cart, remove from cart, multiple items, quantity of items, etc.) and update a virtual shopping cart associated with the identified user 908 using the item identifier.

As FIG. 9 depicts, the user 908 may have engaged in a shopping session in the materials handling facility 902. For instance, the user 908 may have selected an item 906 from an inventory location 912 (e.g., shelf, aisle, etc.) and placed the item 906 in the cart 904 (e.g., shopping cart). The inventory location 912 may house one or more different types of items 906 and the user 908 may pick (i.e., take, retrieve, etc.) one of these items 906.

As illustrated, the materials handling facility 902 (or "facility") may have one or more entry locations 914, such as lanes. The entry location 914 may be defined by a gate in some examples and may include a movable barrier to control movement of users 908. For example, the gate may include computer-controlled panels that may be closed to impede passage of the users 908 or opened to permit passage of the user 908. Upon entering a facility 902, a user 908 may desire to utilize a cart 904 for their shopping session to transport items 906 around the facility 902 during their shopping session. In such examples, the user 908 may approach a cart corral 916, or other locations, at which carts 904 are stored. In some examples, the cart corral 916 may comprise a structure, such as an aisle, for storing nested carts 918.

Generally, two or more of the carts 904 may be configured to nest or otherwise functionality join with one another, so that the carts 904 may be easily stored in a cart corral 916, and/or transported in bulk. In some examples, the cart corral 916 may provide additional functionality beyond storage. For instance, the cart corral 916 may facilitate charging of the nested carts 918 that are in the cart corral 916. For instance, the cart corral 916 may have various electrical contacts extending along the length of a horizontal and/or vertical member of the corral 916 that, when placed in electrical contact with an electrical contact of the nested carts 918, charge one or more batteries of the nested carts 918. In other examples, power cords may extend from the cart corral 916 that may be plugged into the nested carts 918 to recharge batteries of the nested carts 918 while not in use.

In some instances, as described above, each of the nested carts 918 may reside in a low-power (e.g., deep-sleep) state when in the cart corral 916. For instance, proximity sensors of the cart may detect an object (e.g., another cart) very near and, in response, may cause the respective cart to enter the low-power state. In addition, or in the alternative, each cart may include a mechanical switch that may be actuated when placed into the cart corral 916, resulting in the cart entering the low-power state. In still other instances, when the cart corral 916 includes the electrical contacts to contact with corresponding contacts of the nested carts 918, each cart may use this signal to cause the cart to enter the low-power state. Of course, while a few examples are provided, the carts may enter the low-power state in any number of ways when nested with other carts in the corral 916.

To utilize a cart 904, a user 908 may approach an unused cart that is not currently engaged in a shopping session (e.g., a nested cart 918), and interact with the unused cart 904 to identify themselves to the cart 904 and begin a shopping session. For instance, the carts 904 may include a first imaging device 934(1) (e.g., an image sensor such as a camera, photodetector, or other sensing apparatus designed to read a one or two-dimensional barcode) such that when a user 908 presents a user device, or portion thereof, such as the display, to the imaging device 934(1), the cart 904 may identify the user and corresponding user account for a shopping session. Other types of interaction may be performed by a user 908 to identify themselves to a cart 904 (e.g., uttering a name or other keyword to identify the user 908, presenting the user's face for facial recognition, typing in a password or other user information into a display of the cart 904, and/or any other type of user identification technique).

Further, in some instances the cart 904 may transition from a low-power state to a higher-power state in response to the user approaching the cart 904 and/or removing the cart

904 from the corral 916. For instance, the imaging devices 934 and/or the proximity sensors may identify the user approaching (e.g., entering within the threshold distance of the cart 904) and, in response, may cause the cart to enter the higher-power state by, for example, powering on and/or up one or more components that were previously powered off and/or down. In another example, removing the cart 904 from the corral 916 may cause the mechanical switch to trip or may cause the electrical contacts of the corral 916 to become uncoupled from the contacts of the cart 904, resulting in the cart entering the higher-power state. Again, while a few examples are provided, it is to be appreciated that the cart may transition from a low-power state to a higher-power state in response to being removed from the corral 916 and/or in response to a user approaching the cart 904 in any number of other ways.

Once a user has identified themselves to the cart 904, the item-identifying functionality of the cart 904 may be activated such that subsequent items 906 placed in the cart 904 will be identified by the cart 904 and added to a virtual shopping cart for the user 908. As illustrated, a user 908 may move the cart 904 around the facility 902 to one or more inventory locations 912. The user 908 may retrieve items from the inventory location 912 and place the items 906 in the cart 904. Additionally, the user 908 may retrieve items 906 from the cart 904 and put the items 906 back in an inventory location 912, such as when the user 908 changes their mind regarding their desire to purchase or otherwise acquire the item 906. The cart 904 may include various components for identifying item identifiers corresponding to the items 906 placed in the cart and maintaining a virtual shopping cart for the shopping session of the user 908.

Once the user 908 has finished their shopping session, the user 908 may end the shopping session in various ways. For instance, the user 908 may return the cart 904 to the cart corral 916, provide input to the cart 904 indicating an end of the shopping session (e.g., utterance, utilize a user interface element on a touch display, etc.), or simply remove item bags or other item carriers from the cart 904 and leave the facility 902. After the user 908 has ended their shopping session, the list of item identifiers in the virtual shopping cart may be uploaded to one or more remote servers 920, over one or more networks 922, that manage user accounts for users 908 of the facility 902. The server(s) 920 may charge the appropriate user account for the listing of the items in the virtual shopping cart that the user took from the facility 902. For instance, the server(s) 920 may be configured to determine or generate information indicative of a cost of the items 906 picked by the user 908. Additionally, the server(s) 920 may store payment information (e.g., credit card information, bank account information, etc.) for each user account. In this way, when the user 908 finished their shopping session and the cart 904 sends the listing of item identifiers in the virtual shopping cart over the network(s) 922 to the server(s) 920, the server(s) 920 may be configured to determine a cost or price for all of the listed item identifiers, and charge the user via their payment information for the items 906 selected during their shopping session. In this way, the user 908 need not go through steps of a traditional check-out experience (e.g., waiting in line for a cashier, scanning items with the cashier, paying for items at the cashier, etc.).

The network(s) 922 may include private networks such as an institutional or personal intranet, public networks such as the Internet, or a combination thereof. The network(s) 922 may utilize wired technologies (e.g., wires, fiber optic cable, and so forth), wireless technologies (e.g., radio frequency, infrared, acoustic, optical, and so forth), or other connection technologies. The network(s) 922 is representative of any type of communication network, including one or more of data networks or voice networks. The network(s) 922 may be implemented using wired infrastructure (e.g., copper cable, fiber optic cable, and so forth), a wireless infrastructure (e.g., cellular, microwave, satellite, etc.), or other connection technologies.

The cart 904 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 922 according to the type of protocol or standard being used. As noted above, in some examples, the servers 920 may perform some or all of the operations described below as being performed by the cart 904. While the servers 920 are illustrated as being in a location outside of the facility 902, in other implementations, at least a portion of the servers 920 may be located at the facility 902.

As illustrated, the cart 904 may generally include or be formed of a frame 924, a basket 926, a first handle 928(1) for pushing the cart 904, a second handle 928(2) for pulling the cart, a wheel frame 930, and one or more wheel castors 932 to enable movement of the cart 904 on a surface. The frame 924, the basket 926, the handles 928, and the wheel frame 930 may be formed from any suitable materials such as plastics, wood, metals, composites, or any other combinations of materials. Moreover, frame 924, the basket 926, the handle 928, and the wheel frame 930 may take any form.

The basket 926 may generally be part of the frame 924 and/or supported by the frame 924 (e.g., be welded, fused, adhered, bolted, screwed, molded, or otherwise joined to the frame 924). In some examples, the basket 926 may comprise a grid or lattice-like structure (e.g., a honeycombed arrangement or framework) having one or more bars or members that are welded, fused, adhered, bolted, screwed, molded, stitched, or otherwise joined in a substantially perpendicular alignment with respect to one another. The basket 926 may generally be any shape that defines an interior cavity, or receptacle, for receiving items 906 that are placed in the cart 904. The basket 926 may comprise a bottom, multiple sides protruding from the bottom, and a top. As illustrated, the bottom basket 926 may be in the shape of a quadrilateral such that there are four sides protruding from the bottom of the basket 926. Similarly, the top of the basket 926 may be defined according to the quadrilateral shape and have a perimeter with four corners. The perimeter of the top of the basket 926 may define an opening to the interior cavity (or receptacle) of the basket 926 to receive items placed inside the basket 926. In various examples, the perimeter of the top of the basket may be disposed in a substantially horizontal plane (e.g., a plane substantially along the x-axis as illustrated), and the frame 924 may include at least one vertical member that extends downward from the basket 926 to the wheel frame 930 along a substantially vertical plane (e.g., a plane substantially along the y-axis as illustrated).

The wheel frame 930 may support one or more wheel castors 932 to enable movement of the cart 904 along a surface. The wheel casters 932 include one or more wheels, axles, forks, joints, or other components which enable the cart 904 to travel on various surfaces. For example, in some implementations each of the wheel casters 932 may include a single wheel provided on an axle within a fork, or two or more wheels provided on such an axle. In some other implementations, the wheel casters 932 may include two or more axles. Alternatively, in still other implementations, a single caster may be provided in lieu of the multiple wheel casters 932 shown in FIG. 9. In accordance with the present disclosure, the wheel casters 932 may operate in any manner, such as being configured to pivot or swivel, and thus automatically adjust or align with a direction of travel. In some examples, the cart 904 may be equipped with other apparatuses for enabling the cart 904 to travel on solid surfaces, including one or more wheeled components other than casters, including but not limited to omnidirectional wheels, spherical wheels, or other like apparatuses. Additionally, in some other implementations, the cart 904 may include two or more skis or other runners for traveling on smooth surfaces. In still other implementations, the cart 904 may be levitated, e.g., by magnetic levitation through the use of one or more linear induction motors. Moreover, the cart 904 may be propelled or pushed by humans or autonomous mobile robots or, alternatively, by one or more motors (e.g., electric-powered, or gasoline-powered).

As illustrated, the cart 904 may include a first imaging device 934(1), for identifying a user operating the cart as described above, and additional, second imaging devices 934(2), 934(3), 934(4) . . . , 934(N) that include components for use in identifying items placed in the basket 926 and removed from the basket 926. The imaging device 934(1) may, in some instances, be positioned in a manner such that an FOV of the imaging device 934(1) is away from the basket 926 and substantially towards the first handle 928(1) where a user may typically operate the cart 904. The imaging devices 934(2)-(N) may be positioned at any location on the cart 904 (e.g., in the basket 926, on the basket 926, mounted to the frame 924, mounted to the basket 926, and/or any other location), oriented to have respective FOVs for identifying events that occur within and proximate to the basket 926. In some examples, the cart 904 may include at least four of the second imaging devices 934(1), 934(2), 934(3), and 934(N) that are disposed or coupled proximate to four corners of the top of the basket 926. In some examples, one or all of the components of the second imaging devices may be disposed internal to the form factor of the basket 926 and/or frame 924, at least partially internal to the form factor of the basket 926 and/or frame 924, and/or entirely external to the form factor of the basket 926 and/or frame 924 (e.g., mounted to the cart 904). However, in the illustrated example, the second imaging devices may be disposed at locations proximate to the four corners of the top or perimeter of the basket 926/frame 924. In some instances, the less that the second imaging devices protrude from the form factor of the cart 904, the more efficiently the carts 904 may be nested with respect to each other.

As described in further detail below with respect to FIG. 10, the cart 904 may further include one or more one light sources (e.g., LED) for emitting light at or prior to the time of the second imaging devices generating the second image data. The cart 904 may further include, in some instances, one or more proximity sensors (e.g., ToF sensor, PIR sensor, etc.). In some examples the proximity sensors may be activated to detect the proximity of users, objects above the top of the basket 926, and/or other objects. The proximity sensors may be configured to generate sensor data that indicates distances between objects above the top of the basket 926 of the cart 904 and the second imaging devices. The cart 904 may include components configured to analyze the sensor data and determine that an item 906 is within some threshold distance from the top of the basket 926 and/or within the basket 926. Upon detecting an object within the threshold proximity of the basket 926 using the proximity sensor, one or more components of the cart 904 may cause the light sources (LEDs) to emit light and the second imaging devices to generate image data. In some examples, the FOVs of the second imaging devices 934(2)-(N) may each at least partially overlap at a location above the top of the basket 926 corresponding to a centroid of the quadrilateral defining the top of the basket 926. The light sources may illuminate the basket 926 and/or the area above the top of the basket 926 to illuminate items 906 being placed in the cart 904, or removed from the cart 904, to act as a "flash" for the cameras that are generating image data. The second imaging devices may generate image data for a predefined period of time and/or until the proximity sensors (or the image data itself) indicates that there is no longer an object within the threshold distance from the cart 904 or top of the cart 904.

After generating the image data, one or more components of the cart 904 may process the image data to determine an item identifier for the item(s) 906 represented in the image data, and an event 910 for the image data (e.g., addition of an item 906 to the cart, removal of an item 906 from the cart). As described in more detail below, the cart 904 may include component(s) to determine an item 906 identifier for the item 906 (e.g., name of the item 906, SKU number for the item 906, etc.), and determine if the item 906 is being taken from the cart 904, or added to the cart 904, based on the motion of the item 906 and the result of the movement around the cart 904 once movement is no longer detected and represented by the image data. The components of the cart 904 may then update a virtual shopping cart associated with the cart 904 that indicates a virtual listing of items 906 taken by the user 908 from the facility based on the determined event 910. In some examples, the image data may be transmitted to the server(s) 920 over the network(s) 922 where the processing may be performed.

In various examples, the cart 904 may include a display 936 to present various information in user interface(s) for the user 908 to consume. In some examples, the display 936 may comprise a touch screen to receive input from the user 908 (e.g., a selection of an item identifier to disambiguate amongst potential item identifiers). In some instances, the display 936 may present customized information to the user 908 upon identifying the user 908, such as a shopping list of the user or the like. In addition, the display 936 may present the recommendation data, discussed above with reference to FIGS. 1-8.

The cart 904 may further include a battery pack module 938 that houses one or more batteries to power the components of the cart 904. The battery pack module 938 may include rechargeable batteries. In some examples, the battery pack module 938 may be detachably coupled to the wheel frame 930 and/or the frame 924 of the cart 904 such that the battery pack module 938 may be removed and taken to a charging station. In various examples, the battery pack module 938 may include rechargeable batteries that may be charged when the cart 904 is placed in a cart corral 916 (e.g., through electrical contacts, power cords, etc.). In various examples, the frame 924 and/or basket 926 may have one or more channels (e.g., grooves, holes, paths, tunnels, etc.) through which power cables/cords may pass. In this way, power cables may be run at least partially through the channels in the frame 924 and/or basket 926 inconspicuously to provide power to the various components of the cart 904.

In some instances, the cart 904 may further include one or more lighting element(s) 940 disposed on the frame 924 and/or basket 926 of the cart 904. The user 908 may, in some instances, operate a controller to turn on (and off) the lighting element(s) 940 to cause the lighting element(s) to emit light. Further, in some instances the controller may enable the lighting element(s) 940 to transition between multiple light states, such as different colors, flashing effects, and/or the like. The controller operable by the user 908 may comprise functionality accessible to the user 908 via the display (e.g., one or more soft buttons for turning on and/or off the light), a physical toggle switch on the frame 924 of the cart 904, and/or the light. Further, the lighting element(s) 940 may be used to signal a predefined state of the cart 904 and/or the user 908. For example, the user 908 may turn on the lighting element(s) 940 to indicate that he or she requests assistance from an associate of the facility 902, or for any other reason. In some instances, in response to the user 908 operating a controller to request assistance, the cart 904 may perform one or more actions in addition to turning on the lighting element(s) 940. For example, the display may present content responding to this request, such as an offer to connect the user 908 with an associate of the store (e.g., in person, via I/O devices of the cart, etc.). For example, in response to requesting assistance, the cart 904 may facilitate an audio-only or an audio/video call between the user 908 and an associate of the facility using one or more I/O devices on the cart, such as the display, one or more speakers, one or more microphones, one or more cameras pointed toward the user 908 and/or the like.

In still other instances, associates of the facility may, remotely or otherwise, operate the lighting element(s) 940 to change states (e.g., turn on or off) and/or the cart 904 may include components to automatically change a state of the lighting element(s) 940. For example, upon the card identifying that an item of a predefined class of items has entered the basket, the cart 904 may cause the lighting element(s) 940 to change state (e.g., from an off state to an on state) to indicate that an additional checkout workflow may now be required. For example, if the user 908 places an item into the basket 926 that requires the purchasing user to be of a certain age (e.g., alcohol) or to have a certain prescription (e.g., medicine), the cart 904 may illuminate the lighting element(s). In some instances, the cart 904 may include a lighting element on a right side of the frame, a lighting element on a left side of the frame, and/or one or more other lighting elements in other locations on the cart 904.

FIG. 10 illustrates example components of a cart 1000 configured to support at least a portion of the functionality of a cart management system. In some instances, the cart 1000 may correspond to and/or include some or all of the functionality of the carts described above.

The cart 1000 may include one or more processors 1002 (processors) configured to execute one or more stored instructions. The processors 1002 may comprise one or more cores. The cart 1000 may include one or more input/output (I/O) interface(s) 1004 to allow the processor 1002 or other portions of the cart 1000 to communicate with other devices. The I/O interfaces 1004 may comprise Inter-Integrated Circuit (I2C), Serial Peripheral Interface bus (SPI), Universal Serial Bus (USB) as promulgated by the USB Implementers Forum, and so forth. The I/O interfaces 1004 may allow the various modules/components to communicate with each other and/or control each other.

The cart 1000 may also include one or more communication interfaces 1006. The communication interfaces 1006 are configured to provide communications between the cart 1000 and other devices, such as the server(s), sensors, interface devices, routers, and so forth. The communication interfaces 1006 may include devices configured to couple to personal area networks (PANs), wired and wireless local area networks (LANs), wired and wireless wide area networks (WANs), and so forth. For example, the communication interfaces 1006 may include devices compatible with Ethernet, Wi-Fi™, and so forth. The cart 1000 may also include one or more busses or other internal communications hardware or software that allow for the transfer of data between the various modules and components of the cart 1000.

The cart 1000 may also include the one or more sensors 118, such as the first imaging device for identifying a user operating the cart and one or more second imaging devices for identifying items placed into and removed from a basket of the cart. The cart 1000 may further include the light sources, the lighting elements, and weight sensors described above.

In some instances, the cart 1000 further includes one or more proximity sensors 1010. The proximity sensors 1010 may comprise any type of sensor that is able to detect the presence of nearby objects without the need for physical contact (e.g., ToF sensors, PIR sensors, infrared sensors, capacitive sensors, ultrasonic sensors, etc.). As described above, each proximity sensor may be configured to output an indication when the respective proximity sensor detects an object within a threshold distance of the sensor. Further, the configured threshold distances may vary from sensor to sensor in order to collectively create a virtual perimeter. Further, in some instances a single proximity sensor may be configured with multiple threshold distances. For instance, in the example of a proximity sensor having 104 diodes, the senor may be effectively split into quadrants of sixteen sensors such that each quadrant is configured to output an indication when an object is detected at a threshold distance that is potentially unique to the other three quadrants. For instance, a distance of a closest object of each diode of the sixteen diodes in a particular quadrant may be averaged and this average distance may be compared to a threshold to determine whether to output an indication that an object has been detected.

The imaging devices, meanwhile, may comprise any type of camera or imaging device configured to generate image data (and/or video data) or information descriptive of a plurality of picture elements or pixels. Additionally, in some instances the cart 1000 may include one or more imaging devices that are outward-facing and that generate image data representing the facility around the cart 1000.

The cart 1000 may include one or more power supply(ies) 1014 to provide power to the components of the cart 1000, such as the battery pack module. The power supply(ies) 1014 may also include a secondary (e.g., internal) power supply 1018 to allow for hot swapping of battery pack modules, such as one or more capacitors, internal batteries, etc.

The cart 1000 may also include a display 1036 configured to display image data, such as pictures, videos, user interface elements, and/or any other image data. The display 1036 may comprise any type of display 1036, and may further be a touch screen to receive touch input from a user. The cart 1000 may also include one or more microphones 1020 and one or more loudspeakers 1022 to facilitate a dialogue with a user 1008, and/or to receive feedback from the user 1008. The microphones 1020 may capture sound representing the user's speech, and the loudspeaker(s) 1022 may output machine-generated words to facilitate a dialogue, prompt a user 1008 for feedback on an item and/or for other information, and/or output other alerts or notifications.

The cart 1000 may include one or more memories 1024. The memory 1024 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1024 provides storage of computer-readable instructions, data structures, program modules, and other data for the operation of the cart 1000. A few example functional modules are shown stored in the memory 1024, although the same functionality may alternatively be implemented in hardware, firmware, or as a system on a chip (SOC).

The memory 1024 may include at least one operating system (OS) component 1026. The OS component 1026 is configured to manage hardware resource devices such as the I/O interfaces 1004, the communication interfaces 1006, and provide various services to applications or components executing on the processors 1002. The OS component 1026 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1024. These components may be executed as foreground applications, background tasks, daemons, and so forth. A communication component 1028 may be configured to establish communications with one or more of the sensors, one or more of the servers, or other devices. The communications may be authenticated, encrypted, and so forth.

The memory 1024 may further store a cart management system 1030. The cart management system 1030 is configured to provide the item-identifying functions (and other functions) provided by the cart 1000 as described herein. For example, the cart management system 1030 may be configured to identify a user operating a cart, identify items placed into the cart, and maintain a virtual shopping cart for a user 1008 of the cart 1000. While these components are described as operating on the cart 1000, in some instances some or all of these components reside additionally or alternatively on the servers or elsewhere.

The cart management system 1030 may include a user-activation component 1032 that performs operations for activating a shopping session using a cart 1000 on behalf of a user 1008. For instance, a user 1008 may have previously registered for a user account with an operator of the facility to utilize various automated management services provided by an operator of the facility. The user 1008 may have registered for a user account, such as by providing user data 1052, to automate payments made for items taken by the user and included a payment means (e.g., credit card, bank account number, etc.), and may have also provided an identification means in the user data 1052 to the user-activation component 1032 such that the cart 1000 can recognize the user 1008. For instance, the user 1008 may have registered to identify themselves to the cart 1000 using any identification technique by the user-activation component 1032, such as by providing user data 1052 by presenting an identification means to the first imaging device (e.g., presenting a driver's license, presenting a facility-issued card, presenting a user identifier via a mobile phone, etc.), speaking a predefined utterance that is captured by the microphones 1020 (e.g., a name of the user, a predefined keyword, etc.), and/or looking into a camera for facial recognition. Once a user 1008 has identified themselves to using the user-activation component 1032, the user-activation component 1032 may open a shopping session where the cart 1000 identifies and track items retrieved by the user 1008 and placed in the cart 1000.

The cart management system 1030 may additionally include an activity-detection component 1034 configured to detect items (or objects) within a particular proximity to the cart. For example, one or more proximity sensor(s) 1010 may generate sensor data 1054 that indicates a distance between the proximity sensor(s) 1010 and any objects located in the FOV of the proximity sensor(s). The activity-detection component 1034 may analyze the sensor data 1054 and determine if an object is within a threshold distance indicating that the object is near the cart 1000 and/or within or near the perimeter of the top of the basket of the cart 1000 (e.g., one foot from the proximity sensor(s), two feet from the proximity sensor(s), etc.). In this way, the proximity sensor(s) may generate sensor data 1054 that indicates whether or not an item is being moved in or out of the basket of the cart 1000. However, in some examples, rather than using sensor data 1054 generated by a proximity sensor(s), the activity-detection component 1034 may utilize image data 1056 generated by the imaging devices to determine if an object is within a threshold distance from the cart 1000.

The cart management system 1030 may further include a strobing component configured to cause the light sources and/or shutters of the imaging devices to strobe according to different frequencies. As noted above, the light sources may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources to emit light in the visible spectrum. When generating image data 1056 using the imaging devices, motion blur may appear when capturing fact moving objects. However, the motion blur may be reduced or eliminated by exposing the imaging device's imager for a short (e.g., sub-millisecond) durations. Accordingly, the strobing component may strobe the opening and closing of shutters of the imaging devices to limit the sensor exposure duration. Additionally, the strobing component may cause the LEDs to emit/strobe light at a particular frequency. In some instances, the strobing component may cause the LEDs to strobe at a first rate (e.g., 7200 hertz) prior to detecting predefined activity, such as a user placing an item into or removing an item from a cart, while causing the LEDs to strobe at a second, different rate (e.g., 100 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 1030 may also include an item-identification component 1038 configured to analyze image data 1056 to identify an item represented in the image data 1056. The image data 1056 may comprise information descriptive of a plurality of picture elements, or pixels, for one or more image frames (e.g., a still picture, multiple picture frames, video frames, etc.). The item-identification component 1038 may analyze the image data 1056 using various image processing techniques, or computer vision techniques. For instance, the item-identification component 1038 may extract a representation of an item depicted in the image data 1056 generated by at least one imaging device. The representation may include identifying text printed on the item, colors or color schemes printed in the item, determining 2-D and/or 3D shapes of the items, and/or other techniques for extract a representation of the item. In some instances, the representation of the item depicted in the image data 1056 may comprise a numeric representation, such as a feature vector or a set of feature vectors.

In some examples, a data store 1050 stored in the memory 1024 may include item data 1058, which may include representations of the items offered for acquisition at the facility. The item-identification component 1038 may compare the extracted represented of the item with the "gallery" or stored representations of the known items in the item data 1058. In some instance, the item representation may include an indication of a barcode or SKU data for the item as recognized in, or extracted from, the image data 1056. The item-identification component 1038 may determine confidence level data 1062 based on the comparisons with item representation in the item data 1058. The item-identification component 1038 may determine, and assign, confidence levels indicating how likely it is that the item represented in the image data 1056 corresponds to an item from the item gallery in the item data 1058. Based on the confidence level data 1062, the item-identification component 1038 may determine an item identifier 1070 for the item in the image data 1056 (or multiple item identifiers 1070) that corresponds to an item in the item data 1058 to which the item corresponds.

In some examples, the data store 1050 may include physical-layout data 1074 that is used by the item-identification component 1038 to determine the item. The physical-layout data 1074 may include or provide a mapping of physical locations within the physical layout of devices and objects such that the location of the cart 1000 may be utilized to determine an item stored nearby. The physical-layout data 1074 may indicate the coordinates within the facility of an inventory location 1012, items stored at that inventory location 1012, and so forth. In examples where the cart 1000 has location determining sensors (e.g., GPS, RFID, proximity, etc.), the location sensor data may be used to determine where in the store the user 1008 is. In such examples, the item-identification component 1038 may access the physical-layout data 1074 to determine if a location associated with the event is associated with items, and confidence levels for the corresponding representations of items in the item data 1058. Continuing the example above, given the location within the facility of the event and image camera data, the physical-layout data 1074 may determine the items that may have been represented in generated images of the event.

The cart management system 1030 may further include an event-determination component 1040 to determine event-description data 1060 for the item in the image data 1056. The event-determination component 1040 may determine if the user 1008 is adding an item to the cart 1000, removing the item from the cart 1000, etc., based on movement of the item and/or whether the item is shown in the image data 1056. For instance, if the item is shown as being moved downward towards the interior of the cart 1000, and the user's hand then leaves the basket without the item, it can be determined that the user 1008 added the item to the cart 1000. Similarly, if the user's hand moves into the cart without an item and is depicted in the image data 1056 taking an item from the cart, the event-determination component 1040 may determine that the user 1008 removed an item from the cart 1000.

The cart management system 1030 may also include a virtual-cart management component 1042 configured to manage virtual shopping cart data 1068 for the cart 1000. For instance, the virtual-cart management component 1042 may utilize the item data 1058, event-description data 1060, and confidence level data 1062 to add item identifier(s) 1070 to the virtual shopping cart data 1068 for items that were added to the cart 1000, remove item identifier(s) 1070 from the virtual shopping cart data 1068 for items that were removed from the cart 1000, and track item quantity data 1072 indicating quantities of particular items in the cart 1000.

The cart management system 1030 may further include a user-interface component 1044 configured to present user interfaces on the display 1036 based on user-interface data 1076. The user interfaces 1076 may include one or more fields to present data, and/or receive touch input (or other input via a keyboard, mouse, etc.) from a user 1008. For instance, if the item-identification component 1038 is unable to determine an item identifier 1070 for an item shown in the image data 1056, the user-interface component 1044 may receive inquiry data 1064 generated by an inquiry component 1064 to prompt a user 1008 for feedback to help identify the item, and/or other information (e.g., if multiple items were placed in the cart 1000). The inquiry component 1046 may be configured to generate inquiry data 1064 based on the information needed to identify the item. For instance, the inquiry data 1064 may include a prompt to request particular feedback from the user 1008, such as to provide input (e.g., touch input, vocal/utterance input, etc.) to identify the item, input to indicate how many items were added to the cart, input to indicate whether an item was removed or added, etc. In some examples, the user-interface component 1044 may present one or more images depicting items from the item data 1058 that have the highest confidence levels as corresponding to the item in the image data 1056, but confidence levels that are not high enough to make a final decision as to the item. For instance, the user-interface component 1044 may present pictures of two different items that have high confidence levels 1062 and request that the user 1008 select or indicate the appropriate item. Additionally, or alternatively, the user-interface component 1044 may present user-interface data 1076 that prompts the user for feedback regarding whether or not the item was added to, or removed from the cart 1000. Responses to the inquiry data 1064 may be stored as response data 1066.

In some examples, the cart management system 1030 may further a power-saving component 1080 configured to selectively power off or down one or more components of the cart 1000 when the cart 1000 determines that no users are within a threshold distance of the cart 1000.

For example, the power-saving component 1080 may be configured to determine when a user is not within a threshold distance and, in response, may instruct one or more components of the cart 1000 to power off or otherwise lessen the power the components consume from the batter(ies) 1016. For example, the power-saving component may instruct the item-identification component 1038 and/or the event-determination component 1040 to stop performing image-processing on the image data 1056 generated by the imaging devices or may instruct these components to perform the image-processing at a lesser frame rate. Additionally, or alternatively, the power-saving component may instruct the user-activation component 1032 or the activity-detection component 1034 to refrain from performing image-processing on the image data 1056 or lessen the frame rate at which these components perform the image-processing. In addition, or in the alternative, the power-saving component 1080 may instruct any of the other components of the cart management system 1030 to power off or down in order to consume less power in response to determining that a user is not within the threshold distance of the cart 1000, and/or may instruct any other software and/or firmware components of the cart 1000 to power off or down in response.

In addition, or in the alternative, the power-saving component 1080 may instruct one or more hardware components of the cart 1000 to power off or down in response to determining that a user is not within the threshold distance of the cart 1000. For instance, the power-saving component 1080 may instruct the imaging devices to power off or lessen a frame rate at which the imaging components generate the image data. Additionally, or alternatively, the power-saving component 1080 may instruct the display 1036 to power off (or dim its brightness) and/or may instruct the light sources, lighting elements, weight sensors (and/or weight-sensing firmware/software), the communication interfaces 1006, I/O interfaces 1004, the microphones 1020, the loudspeakers 1022, and/or any other hardware component of the cart 1000 to power off or otherwise consume less power from the batter(ies) 1016. Furthermore, in addition to power off or down any of these software, firmware, and/or hardware components of the cart 1000, the power-saving component 1080 may be configured to power on or up each of these components in response to determining that a user is within the threshold distance of the cart 1000.

The power-saving component 1080 may determining whether a user is within the threshold distance of the cart 1000 based on proximity data 1078 generated by the proximity sensors 1010. For instance, the power-saving component 1080 may receive the proximity data 1078 and analyze the proximity data to determine whether a user is within the threshold distance. In some instances, the proximity data 1078 indicates, for each sensor or quadrant (or the like) of a sensor, the distance to a closest user or other object. Thus, the power-saving component 1080 may determine whether the closest user/object is within the threshold distance and, if not, may send the instruction(s) for causing the component(s) to lessen their consumed power. Further, in some instances, the power-saving component 1080 may input the proximity data 1078 and/or additional sensor data generated at the same/similar time as the subject proximity data (e.g., image data 1056, accelerometer data, etc.) into one or more trained models 1082 for determining whether or not the object within the threshold distance of the cart corresponds to a user. If the trained model indicates that the object (or each object) detected by the proximity sensors 1010 does not correspond to a user, but rather an inanimate object (e.g., a rack in the facility), then the power-saving component 1080 may send the instruction(s) to lessen power consumed by the component(s) even if one or more (non-user) objects are detected within the threshold distance of the cart. It is to be appreciated that the trained model(s) may be trained by inputting training data in the form of labelled results (user, no user) and corresponding sensor data into the model during the training process. Of course, while one example is provided, the model(s) 1082 may be trained in any other manner.

In addition, while the above example describes the proximity sensors 1010 outputting proximity data 1078 indicating the distance to a nearest object, in some instances the proximity sensors may output an indication when an object is within a threshold distance but not otherwise. For instance, a first proximity sensor may be configured to output an indication in response to detecting an object within one foot, while another proximity sensor (or quadrant of the same proximity sensor) may be configured to output an indication in response to detecting an object within two feet. Thus, these proximity sensors may output the respective indications in response to detecting an object within their respective threshold distances, but otherwise may refrain from outputting data to the power-saving component 1080. Thus, the power-saving component 1080 may cause the component(s) to power off and/or down based on not receiving an indication of an object within a threshold distance from the proximity sensors 1010 for a threshold amount of time. In addition, the power-saving component 1080 may cause the component(s) to power off and/or down in response to receiving an indication that each object detected by a proximity sensor 1010 within a threshold distance within a certain amount of time does not correspond to a user, as determined by the trained model(s) 1082.

Figure 11:
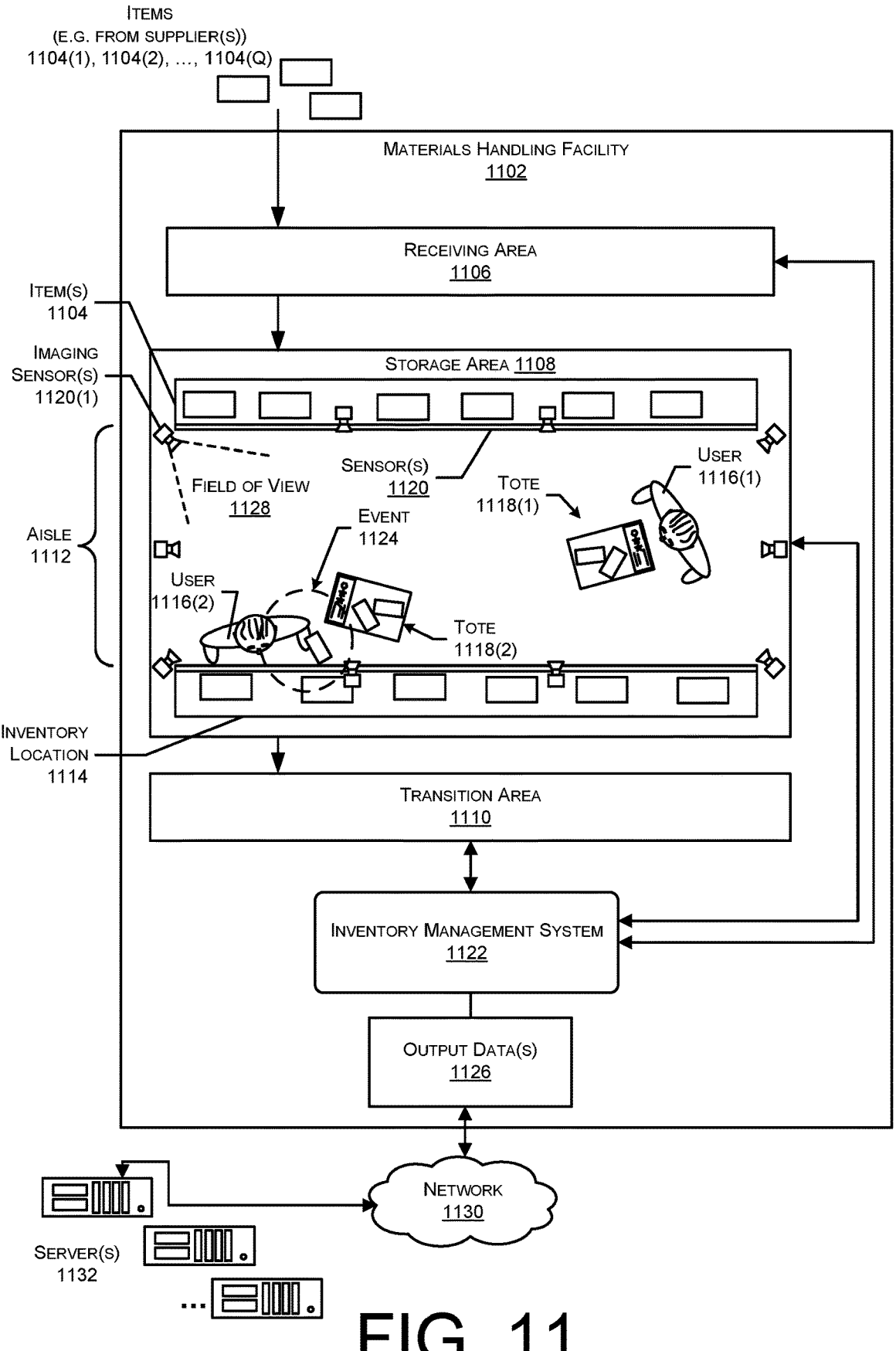
FIG. 11 is a block diagram of an example materials handling facility that includes sensors and an inventory management system configured to generate output regarding events occurring in the facility using the sensor data, according to at least one example.
Figure 12:
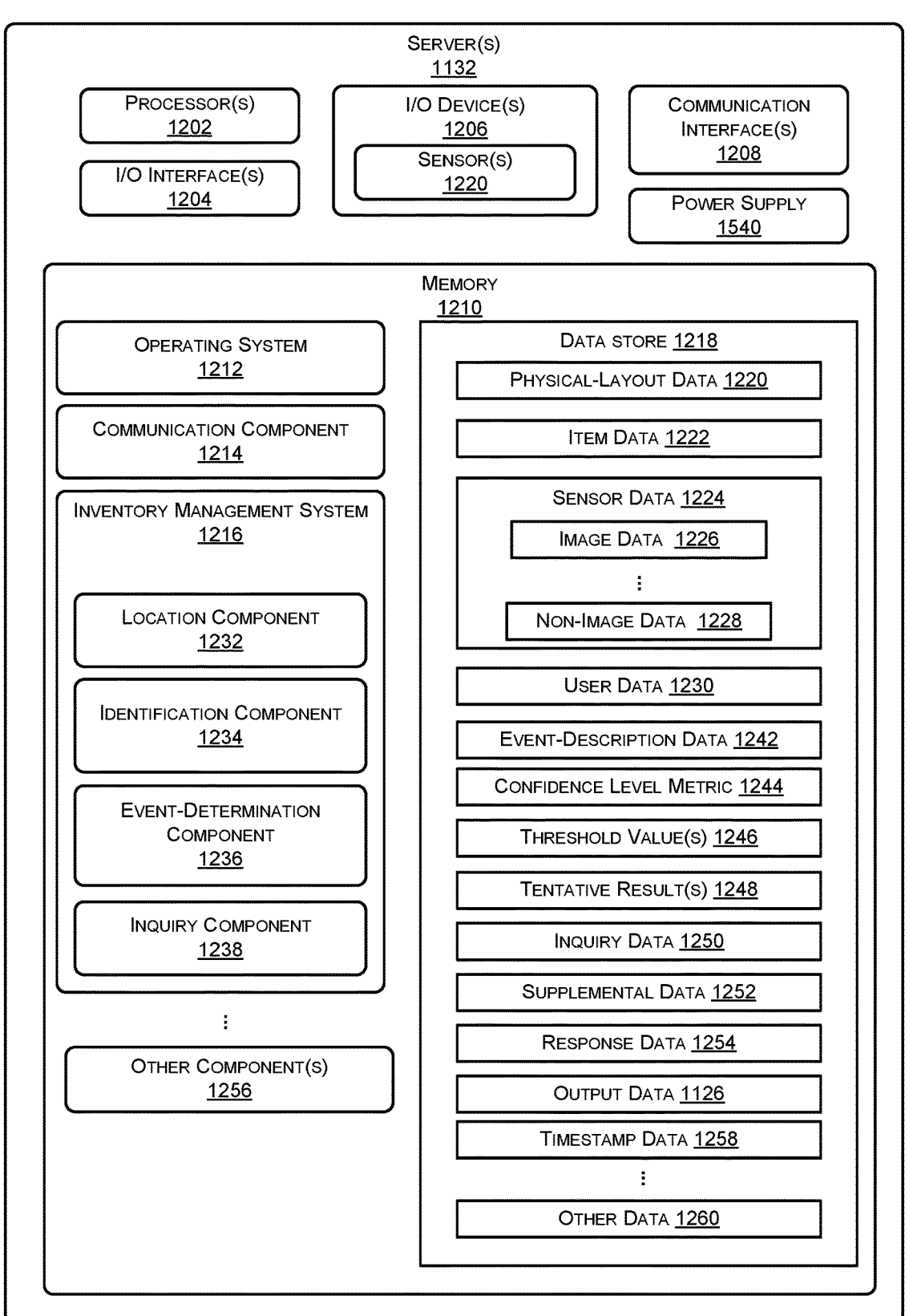
FIG. 12 illustrates a block diagram of one or more servers configured to support operation of the facility, according to at least one example.

FIGS. 11 and 12 represent an illustrative materials handling environment, such as the materials handling facility 1102, in which the techniques described herein may be applied to cameras monitoring the environments as described below. However, the following description is merely one illustrative example of an industry and environment in which the techniques described herein may be utilized. The materials handling facility 1102 (or "facility") comprises one or more physical structures or areas within which one or more items 1104(1), 1104(2), . . . , 1104(Q) (also referred to as "items 1104") may be held. As used in this disclosure, letters in parentheses such as "(Q)" indicate an integer result. The items 1104 comprise physical goods, such as books, pharmaceuticals, repair parts, electronic gear, groceries, and so forth.

The facility 1102 may include one or more areas designated for different functions with regard to inventory handling. In this illustration, the facility 1102 includes a receiving area 1106, a storage area 1108, and a transition area 1110. The receiving area 1106 may be configured to accept items 1104, such as from suppliers, for intake into the facility 1102. For example, the receiving area 1106 may include a loading dock at which trucks or other freight conveyances unload the items 1104.

The storage area 1108 is configured to store the items 1104. The storage area 1108 may be arranged in various physical configurations. In one implementation, the storage area 1108 may include one or more aisles 1112. The aisle 1112 may be configured with, or defined by, inventory locations 1114 on one or both sides of the aisle 1112. The inventory locations 1114 may include one or more of shelves, racks, cases, cabinets, bins, floor locations, or other suitable storage mechanisms for holding or storing the items 1104. The inventory locations 1114 may be affixed to the floor or another portion of the facility's structure, or may be movable such that the arrangements of aisles 1112 may be reconfigurable. In some implementations, the inventory locations 1114 may be configured to move independently of an outside operator. For example, the inventory locations 1114 may comprise a rack with a power source and a motor, operable by a computing device to allow the rack to move from one location within the facility 1102 to another.

One or more users 1116(1), 1116(2) (also referred to as "users 1116")), totes 1118(1), 1118(2) (also referred to as "totes 1118")) or other material handling apparatus may move within the facility 1102. For example, the users 1116 may move about within the facility 1102 to pick or place the items 1104 in various inventory locations 1114, placing them on the totes 1118 for ease of transport. A tote 1118 is configured to carry or otherwise transport one or more items 1104. For example, a tote 1118 may include a basket, a cart, a bag, and so forth. In other implementations, other agencies such as robots, forklifts, cranes, aerial drones, and so forth, may move about the facility 1102 picking, placing, or otherwise moving the items 1104.

One or more sensors 1120 may be configured to acquire information in the facility 1102. The sensors 1120 in the facility 1102 may include sensors fixed in the environment (e.g., ceiling-mounted cameras) or otherwise, such as sensors in the possession of users (e.g., mobile phones, tablets, etc.). The sensors 1120 may include, but are not limited to, sensors 1120(1), weight sensors, radio frequency (RF) receivers, temperature sensors, humidity sensors, vibration sensors, and so forth. The sensors 1120 may be stationary or mobile, relative to the facility 1102. For example, the inventory locations 1114 may contain sensors 1120(1) configured to acquire images of pick or placement of items 1104 on shelves, of the users 1116(1) and 1116(2) in the facility 1102, and so forth. In another example, the floor of the facility 1102 may include weight sensors configured to determine a weight of the users 1116 or another object thereupon.

During operation of the facility 1102, the sensors 1120 may be configured to provide information suitable for tracking how objects move or other occurrences within the facility 1102. For example, a series of images acquired by a sensor 1120(1) may indicate removal of an item 1104 from a particular inventory location 1114 by one of the users 1116 and placement of the item 1104 on or at least partially within one of the totes 1118.

While the storage area 1108 is depicted as having one or more aisles 1112, inventory locations 1114 storing the items 1104, sensors 1120, and so forth, it is understood that the receiving area 1106, the transition area 1110, or other areas of the facility 1102 may be similarly equipped. Furthermore, the arrangement of the various areas within the facility 1102 is depicted functionally rather than schematically. For example, multiple different receiving areas 1106, storage areas 1108, and transition areas 1110 may be interspersed rather than segregated in the facility 1102.

The facility 1102 may include, or be coupled to, an inventory management system 1122, which may perform some or all of the techniques described above with reference to FIGS. 1-13. For example, the inventory management system 1122 may maintain a virtual cart of each user within the facility. The inventory management system 1122 may also store a record associated with each user indicating an identifier associated with the user, the location of the user, and whether the user is eligible to exit the facility with one or more items without performing a manual checkout of the items. The inventory management system 1122 may also generate and output notification data to the usersm 1416, indicating whether or not they are so eligible.

As illustrated, the inventory management system 1122 may reside at the facility 1102 (e.g., as part of on-premises servers), on the servers 1132 that are remote from the facility 1102, a combination thereof. In each instance, the inventory management system 1122 is configured to identify interactions and events with and between users 1116, devices such as sensors 1120, robots, material handling equipment, computing devices, and so forth, in one or more of the receiving area 1106, the storage area 1108, or the transition area 1110. As described above, some interactions may further indicate the existence of one or more events 1124, or predefined activities of interest. For example, events 1124 may include the entry of the user 1116 to the facility 1102, stocking of items 1104 at an inventory location 1114, picking of an item 1104 from an inventory location 1114, returning of an item 1104 to an inventory location 1114, placement of an item 1104 within a tote 1118, movement of users 1116 relative to one another, gestures by the users 1116, and so forth. Other events 1124 involving users 1116 may include the user 1116 providing authentication information in the facility 1102, using a computing device at the facility 1102 to authenticate identity to the inventory management system 1122, and so forth. Some events 1124 may involve one or more other objects within the facility 1102. For example, the event 1124 may comprise movement within the facility 1102 of an inventory location 1114, such as a counter mounted on wheels. Events 1124 may involve one or more of the sensors 1120. For example, a change in operation of a sensor 1120, such as a sensor failure, change in alignment, and so forth, may be designated as an event 1124. Continuing the example, movement of a sensor 1120(1) resulting in a change in the orientation of the field of view 1128 (such as resulting from someone or something bumping the sensor 1120(1)) may be designated as an event 1124.

By determining the occurrence of one or more of the events 1124, the inventory management system 1122 may generate output data 1126. The output data 1126 comprises information about the event 1124. For example, where the event 1124 comprises an item 1104 being removed from an inventory location 1114, the output data 1126 may comprise an item identifier indicative of the particular item 1104 that was removed from the inventory location 1114 and a user identifier of a user that removed the item.

The inventory management system 1122 may use one or more automated systems to generate the output data 1126. For example, an artificial neural network, one or more classifiers, or other automated machine learning techniques may be used to process the sensor data from the one or more sensors 1120 to generate output data 1126. For example, the inventory management system 1122 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 1126 or the tentative results. The automated systems may generate confidence level data that provides information indicative of the accuracy or confidence that the output data 1126 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 80%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1104, user 1116, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1116 may pick an item 1104(1) such as a perfume bottle that is generally cubical in shape from the inventory location 1114. Other items 1104 at nearby inventory locations 1114 may be predominantly spherical. Based on the difference in shape (cube vs. sphere) from the adjacent items, and the correspondence in shape with the previously stored image of the perfume bottle item 1104(1) (cubical and cubical), the confidence level that the user 1116 has picked up the perfume bottle item 1104(1) is high.

In some situations, the automated techniques may be unable to generate output data 1126 with a confidence level above a threshold result. For example, the automated techniques may be unable to distinguish which user 1116 in a crowd of users 1116 has picked up the item 1104 from the inventory location 1114. In other situations, it may be desirable to provide human confirmation of the event 1124 or of the accuracy of the output data 1126. For example, some items 1104 may be deemed age restricted such that they are to be handled only by users 1116 above a minimum age threshold.

In instances where human confirmation is desired, sensor data associated with an event 1124 may be processed to generate inquiry data. The inquiry data may include a subset of the sensor data associated with the event 1124. The inquiry data may also include one or more of one or more tentative results as determined by the automated techniques, or supplemental data. The subset of the sensor data may be determined using information about the one or more sensors 1120. For example, camera data such as the location of the sensor 1120(1) within the facility 1102, the orientation of the sensor 1120(1), and a field of view 1128 of the sensor 1120(1) may be used to determine if a particular location within the facility 1102 is within the field of view 1128. The subset of the sensor data may include images that may show the inventory location 1114 or that the item 1104 was stowed. The subset of the sensor data may also omit images from other sensors 1120(1) that did not have that inventory location 1114 in the field of view 1128. The field of view 1128 may comprise a portion of the scene in the facility 1102 that the sensor 1120 is able to generate sensor data about.

Continuing the example, the subset of the sensor data may comprise a video clip acquired by one or more sensors 1120(1) having a field of view 1128 that includes the item 1104. The tentative results may comprise the "best guess" as to which items 1104 may have been involved in the event 1124. For example, the tentative results may comprise results determined by the automated system that have a confidence level above a minimum threshold.

The facility 1102 may be configured to receive different kinds of items 1104 from various suppliers and to store them until a customer orders or retrieves one or more of the items 1104. A general flow of items 1104 through the facility 1102 is indicated by the arrows of FIG. 12. Specifically, as illustrated in this example, items 1104 may be received from one or more suppliers, such as manufacturers, distributors, wholesalers, and so forth, at the receiving area 1106. In various implementations, the items 1104 may include merchandise, commodities, perishables, or any suitable type of item 1104, depending on the nature of the enterprise that operates the facility 1102. The receiving of the items 1104 may comprise one or more events 1124 for which the inventory management system 1122 may generate output data 1126.

Upon being received from a supplier at receiving area 1106, the items 1104 may be prepared for storage. For example, items 1104 may be unpacked or otherwise rearranged. The inventory management system 1122 may include one or more software applications executing on a computer system to provide inventory management functions based on the events 1124 associated with the unpacking or rearrangement. These inventory management functions may include maintaining information indicative of the type, quantity, condition, cost, location, weight, or any other suitable parameters with respect to the items 1104. The items 1104 may be stocked, managed, or dispensed in terms of countable, individual units or multiples, such as packages, cartons, crates, pallets, or other suitable aggregations. Alternatively, some items 1104, such as bulk products, commodities, and so forth, may be stored in continuous or arbitrarily divisible amounts that may not be inherently organized into countable units. Such items 1104 may be managed in terms of measurable quantity such as units of length, area, volume, weight, time, duration, or other dimensional properties characterized by units of measurement. Generally speaking, a quantity of an item 1104 may refer to either a countable number of individual or aggregate units of an item 1104 or a measurable amount of an item 1104, as appropriate.

After arriving through the receiving area 1106, items 1104 may be stored within the storage area 1108. In some implementations, like items 1104 may be stored or displayed together in the inventory locations 1114 such as in bins, on shelves, hanging from pegboards, and so forth. In this implementation, all items 1104 of a given kind are stored in one inventory location 1114. In other implementations, like items 1104 may be stored in different inventory locations 1114. For example, to optimize retrieval of certain items 1104 having frequent turnover within a large physical facility 1102, those items 1104 may be stored in several different inventory locations 1114 to reduce congestion that might occur at a single inventory location 1114. Storage of the items 1104 and their respective inventory locations 1114 may comprise one or more events 1124. In some instances, device(s) may be placed on one or more of the items 1104, where the devise(s) are used to track the one or more items 1104 while within the facility 1102, as described herein.

When a customer order specifying one or more items 1104 is received, or as a user 1116 progresses through the facility 1102, the corresponding items 1104 may be selected or "picked" from the inventory locations 1114 containing those items 1104. In various implementations, item picking may range from manual to completely automated picking. For example, in one implementation, a user 1116 may have a list of items 1104 they desire and may progress through the facility 1102 picking items 1104 from inventory locations 1114 within the storage area 1108, and placing those items 1104 into a tote 1118. In other implementations, employees of the facility 1102 may pick items 1104 using written or electronic pick lists derived from customer orders. These picked items 1104 may be placed into the tote 1118 as the employee progresses through the facility 1102. Picking may comprise one or more events 1124, such as the user 1116 in moving to the inventory location 1114, retrieval of the item 1104 from the inventory location 1114, and so forth.

After items 1104 have been picked, they may be processed at a transition area 1110. The transition area 1110 may be any designated area within the facility 1102 where items 1104 are transitioned from one location to another or from one entity to another. For example, the transition area 1110 may be a packing station within the facility 1102. When the item 1104 arrives at the transition area 1110, the items 1104 may be transitioned from the storage area 1108 to the packing station. The transitioning may comprise one or more events 1124. Information about the transition may be maintained by the inventory management system 1122 using the output data 1126 associated with those events 1124.

In another example, if the items 1104 are departing the facility 1102 a list of the items 1104 may be obtained and used by the inventory management system 1122 to transition responsibility for, or custody of, the items 1104 from the facility 1102 to another entity. For example, a carrier may accept the items 1104 for transport with that carrier accepting responsibility for the items 1104 indicated in the list. In another example, a customer may purchase or rent the items 1104 and remove the items 1104 from the facility 1102. The purchase or rental may comprise one or more events 1124.

The inventory management system 1122 may access or generate sensor data about the facility 1102 and the contents therein including the items 1104, the users 1116, the totes 1118, and so forth. The sensor data may be acquired by one or more of the sensors 1120, data provided by other systems, and so forth. For example, the sensors 1120 may include sensors 1120(1) configured to acquire image data of scenes in the facility 1102. The image data may comprise still images, video, or a combination thereof. The image data may be processed by the inventory management system 1122 to determine a location of the user 1116, the tote 1118, the identifier associated with the user 1116, and so forth. As used herein, the identifier associated with the user may represent a unique identifier of the user (e.g., number associated with user, username, etc.), an identifier that distinguishes the user amongst other users being located within the environment, or the like.

The inventory management system 1122, or systems coupled thereto, may be configured to determine the identifier associated with the user 1116, as well as to determine other candidate users. In one implementation, this determination may comprise comparing sensor data with previously stored identity data. For example, the identifier associated with the user 1116 may be identified by presenting a token carrying authentication credentials, providing a fingerprint, scanning a barcode or other type of unique identifier upon entering the facility, and so forth. The identifier associated with the user 1116 may be determined before, during, or after entry to the facility 1102. Determination of the user's identifier may comprise comparing sensor data associated with the user 1116 in the facility 1102 to previously stored user data.

In some instances, the inventory management system 1122 groups users within the facility into respective sessions. That is, the inventory management system 1122 may utilize the sensor data to determine groups of users that are effectively "together" (e.g., shopping together). In some instances, a particular session may include multiple users that entered the facility 1102 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 1118. Noting the child and the mother as belonging to the same session may increase the chances of successfully adding the box of cereal to the virtual shopping cart of the mother.

By determining the occurrence of one or more events 1124 and the output data 1126 associated therewith, the inventory management system 1122 is able to provide one or more services to the users 1116 of the facility 1102. By utilizing one or more human associates to process inquiry data and generate response data that may then be used to produce output data 1126, overall accuracy of the system may be enhanced. The enhanced accuracy may improve the user experience of the one or more users 1116 of the facility 1102. In some examples, the output data 1126 may be transmitted over a network 1130 to one or more servers 1132.

FIG. 12 illustrates a block diagram of the one or more servers 1132. The servers 1132 may be physically present at the facility 1102, may be accessible by the network 1130, or a combination of both. The servers 1132 do not require end-user knowledge of the physical location and configuration of the system that delivers the services. Common expressions associated with the servers 1132 may include "on-demand computing," "software as a service (Saas)," "cloud services," "data centers," and so forth. Services provided by the servers 1132 may be distributed across one or more physical or virtual devices.

The servers 1132 may include one or more hardware processors 1202 (processors) configured to execute one or more stored instructions. The processors 1202 may comprise one or more cores. The servers 1132 may include one or more input/output (I/O) interface(s) 1204 to allow the processor 1202 or other portions of the servers 1132 to communicate with other devices. The I/O interfaces 1204 may comprise Inter-Integrated Circuit (I2C), Serial Peripheral Interface bus (SPI), Universal Serial Bus (USB) as promulgated by the USB Implementers Forum, and so forth. FIG. 11 also illustrates I/O devices 1206.

The servers 1132 may also include one or more communication interfaces 1208. The communication interfaces 1208 are configured to provide communications between the servers 1132 and other devices, such as the sensors 1120, the interface devices, routers, and so forth. The communication interfaces 1208 may include devices configured to couple to personal area networks (PANs), wired and wireless local area networks (LANs), wired and wireless wide area networks (WANs), and so forth. For example, the communication interfaces 1208 may include devices compatible with Ethernet, Wi-Fi™, and so forth. The servers 1132 may also include one or more busses or other internal communications hardware or software that allow for the transfer of data between the various modules and components of the servers 1132.

The servers 1132 may also include a power supply 1240. The power supply 1240 is configured to provide electrical power suitable for operating the components in the servers 1132.

The servers 1132 may further include one or more memories 1210. The memory 1210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1210 provides storage of computer-readable instructions, data structures, program modules, and other data for the operation of the servers 1132. A few example functional modules are shown stored in the memory 1210, although the same functionality may alternatively be implemented in hardware, firmware, or as a system on a chip (SOC).

The memory 1210 may include at least one operating system (OS) component 1212. The OS component 1212 is configured to manage hardware resource devices such as the I/O interfaces 1204, the communication interfaces 1208, and provide various services to applications or components executing on the processors 1202. The OS component 1212 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1210. These components may be executed as foreground applications, background tasks, daemons, and so forth. A communication component 1214 may be configured to establish communications with one or more of the sensors 1120, one or more of the devices used by associates, other servers 1132, or other devices. The communications may be authenticated, encrypted, and so forth.

The memory 1210 may store an inventory management system 1216. The inventory management system 1216 is configured to provide the inventory functions as described herein with regard to the inventory management system 1122. For example, the inventory management system 1216 may track movement of items 1104 in the facility 1102, generate user interface data, and so forth.

The inventory management system 1216 may access information stored in one or more data stores 1218 in the memory 1210. The data store 1218 may use a flat file, database, linked list, tree, executable code, script, or other data structure to store the information. In some implementations, the data store 1218 or a portion of the data store 1218 may be distributed across one or more other devices including other servers 1132, network attached storage devices, and so forth.

The data store 1218 may include physical layout data 1220. The physical layout data 1220 provides a mapping of physical locations within the physical layout of devices and objects such as the sensors 1120, inventory locations 1114, and so forth. The physical layout data 1220 may indicate the coordinates within the facility 1102 of an inventory location 1114, sensors 1120 within view of that inventory location 1114, and so forth. For example, the physical layout data 1220 may include camera data comprising one or more of a location within the facility 1102 of a sensor 1120(1), orientation of the sensor 1120(1), the operational status, and so forth. Continuing example, the physical layout data 1220 may indicate the coordinates of the sensor 1120(1), pan and tilt information indicative of a direction that the field of view 1128 is oriented along, whether the sensor 1120(1) is operating or malfunctioning, and so forth.

In some implementations, the inventory management system 1216 may access the physical layout data 1220 to determine if a location associated with the event 1124 is within the field of view 1128 of one or more sensors 1120.

Continuing the example above, given the location within the facility 1102 of the event 1124 and the camera data, the inventory management system 1216 may determine the sensors 1120(1) that may have generated images of the event 1124.

The item data 1222 comprises information associated with the items 1104. The information may include information indicative of one or more inventory locations 1114 at which one or more of the items 1104 are stored. The item data 1222 may also include event data, SKU or other product identifier, price, quantity on hand, weight, expiration date, images of the item 1104, detail description information, ratings, ranking, and so forth. Still, in some instances, the item data 1222 may include device data that associated items with devices that are used to track the locations of the items within the facility 1102. The inventory management system 1216 may store information associated with inventory management functions in the item data 1222.

The data store 1218 may also include sensor data 1224. The sensor data 1224 comprises information acquired from, or based on, the one or more sensors 1120. For example, the sensor data 1224 may comprise 3D information about an object in the facility 1102. As described above, the sensors 1120 may include a sensor 1120(1), which is configured to acquire one or more images. These images may be stored as the image data 1226. The image data 1226 may comprise information descriptive of a plurality of picture elements or pixels. Non-image data 1228 may comprise information from other sensors 1120, such as input from microphones, weight sensors, and so forth.

User data 1230 may also be stored in the data store 1218. The user data 1230 may include identity data, information indicative of a profile, purchase history, location data, demographic data, and so forth. Individual users 1116 or groups of users 1116 may selectively provide user data 1230 for use by the inventory management system 1122. The individual users 1116 or groups of users 1116 may also authorize collection of the user data 1230 during use of the facility 1102 or access to user data 1230 obtained from other systems. For example, the user 1116 may opt-in to collection of the user data 1230 to receive enhanced services while using the facility 1102.

In some implementations, the user data 1230 may include information designating a user 1116 for special handling. For example, the user data 1230 may indicate that a particular user 1116 has been associated with an increased number of errors with respect to output data 1126. The inventory management system 1216 may be configured to use this information to apply additional scrutiny to the events 1124 associated with this user 1116. For example, events 1124 that include an item 1104 having a price or result above the threshold amount may be provided to the associates for processing regardless of the determined level of confidence in the output data 1126 as generated by the automated system.

The inventory management system 1216 may include one or more of a location component 1232, identification component 1234, event-determination component 1236, and inquiry component 1238, potentially amongst other components 1256.

The location component 1232 functions to locate items or users within the environment of the facility to allow the inventory management system 1216 to assign certain events to the correct users. That is, the location component 1232 may assign unique identifiers to users as they enter the facility and, with the users' consent, may locate the users throughout the facility 1102 over the time they remain in the facility 1102. The location component 1232 may perform this locating using sensor data 1224, such as the image data 1226. For example, the location component 1232 may receive the image data 1226 and analyze the image data 1226 to identify users from the images. After identifying a particular user within the facility, the location component 1232 may then locate the user within the images as the user moves throughout the facility 1102. Further, should the location component 1232 temporarily "lose" a particular user, the location component 1232 may again attempt to identify the users within the facility based on facial recognition, and/or using other techniques such as voice recognition, or the like.

Therefore, upon receiving the indication of the time and location of the event in question, the location component 1232 may query the data store 1218 to determine which one or more users were at or within a threshold distance of the location of the event at the particular time of the event. Further, the location component 1232 may assign different confidence levels to different users, with the confidence levels indicating how likely it is that each corresponding user is the user that is in fact associated with the event of interest.

The location component 1232 may access the sensor data 1224 in order to determine this location data of the user and/or items. The location data provides information indicative of a location of an object, such as the item 1104, the user 1116, the tote 1118, and so forth. The location may be absolute with respect to the facility 1102 or relative to another object or point of reference. Absolute terms may comprise a latitude, longitude, and altitude with respect to a geodetic reference point. Relative terms may include a location of 210.4 meters (m) along an x-axis and 710.2 m along a y-axis as designated by a floor plan of the facility 1102, 10.2 m from an inventory location 1114 along a heading of 110°, and so forth. For example, the location data may indicate that the user 1116(1) is 210.2 m along the aisle 1112(1) and standing in front of the inventory location 1114. In comparison, a relative location may indicate that the user 1116(1) is 32 cm from the tote 1118 at a heading of 73° with respect to the tote 1118. The location data may include orientation information, such as which direction the user 1116 is facing. The orientation may be determined by the relative direction of the user's body is facing. In some implementations, the orientation may be relative to the interface device. Continuing the example, the location data may indicate that the user 1116(1) is oriented with a heading of 0°, or looking north. In another example, the location data may indicate that the user 1116 is facing towards the interface device.

The identification component 1234 is configured to identify an object. In one implementation, the identification component 1234 may be configured to identify an item 1104. In another implementation, the identification component 1234 may be configured to identify an identifier associated with the user 1116. For example, the identification component 1234 may process the image data 1226 and determine the identity data of the user 1116 depicted in the images by comparing the characteristics in the image data 1226 with previously stored results. The identification component 1234 may also access data from other sensors 1120, such as from an RFID reader, an RF receiver, fingerprint sensors, and so forth.

The event-determination component 1236 is configured to process the sensor data 1224 and generate output data 1126, and may include components described above. The event-determination component 1236 may access information stored in the data store 1218 including, but not limited to, event-description data 1242, confidence levels 1244, or threshold values. In some instances, the event-determination component 1236 may be configured to perform some or all of the techniques described above with regards to the event-determination component 1236. For instance, the event-determination component 1236 may be configured to create and utilize event classifiers for identifying events (e.g., predefined activity) within image data, potentially without use of other sensor data acquired by other sensors in the environment.

The event-description data 1242 comprises information indicative of one or more events 1124. For example, the event-description data 1242 may comprise predefined profiles that designate movement of an item 1104 from an inventory location 1114 with the event 1124 of "pick". The event-description data 1242 may be manually generated or automatically generated. The event-description data 1242 may include data indicative of triggers associated with events occurring in the facility 1102. An event may be determined as occurring upon detection of the trigger. For example, sensor data 1224 such as a change in weight from a sensor 1120 at an inventory location 1114 may trigger detection of an event of an item 1104 being added or removed from the inventory location 1114. In another example, the trigger may comprise an image of the user 1116 reaching a hand toward the inventory location 1114. In yet another example, the trigger may comprise two or more users 1116 approaching to within a threshold distance of one another.

The event-determination component 1236 may process the sensor data 1224 using one or more techniques including, but not limited to, artificial neural networks, classifiers, decision trees, support vector machines, Bayesian networks, and so forth. For example, the event-determination component 1236 may use a decision tree to determine occurrence of the "pick" event 1124 based on sensor data 1224. The event-determination component 1236 may further use the sensor data 1224 to determine one or more tentative results 1248. The one or more tentative results 1248 comprise data associated with the event 1124. For example, where the event 1124 comprises a disambiguation of users 1116, the tentative results 1248 may comprise a list of possible user identities. In another example, where the event 1124 comprises a disambiguation between items, the tentative results 1248 may comprise a list of possible item identifiers. In some implementations, the tentative result 1248 may indicate the possible action. For example, the action may comprise the user 1116 picking, placing, moving an item 1104, damaging an item 1104, providing gestural input, and so forth.

In some implementations, the tentative results 1248 may be generated by other components. For example, the tentative results 1248 such as one or more possible identities or locations of the user 1116 involved in the event 1124 may be generated by the location component 1232. In another example, the tentative results 1248 such as possible items 1104 that may have been involved in the event 1124 may be generated by the identification component 1234.

The event-determination component 1236 may be configured to provide a confidence level 1244 associated with the determination of the tentative results 1248. The confidence level 1244 provides indicia as to the expected level of accuracy of the tentative result 1248. For example, a low confidence level may indicate that the tentative result 1248 has a low probability of corresponding to the actual circumstances of the event 1124. In comparison, a high confidence level may indicate that the tentative result 1248 has a high probability of corresponding to the actual circumstances of the event 1124.

In some implementations, the tentative results 1248 having confidence levels 1244 that exceed the threshold may be deemed to be sufficiently accurate and thus may be used as the output data 1126. For example, the event-determination component 1236 may provide tentative results 1248 indicative of the three possible items 1104(1), 1104(2), and 1104(3) corresponding to the "pick" event 1124. The confidence levels 1244 associated with the possible items 1104(1), 1104(2), and 1104(3) may be 210%, 70%, 102%, respectively. Continuing the example, the threshold value 1046 may be set such that confidence level 1244 of 100% are deemed to be sufficiently accurate. As a result, the event-determination component 1236 may designate the "pick" event 1124 as involving item 1104(3).

The inquiry component 1238 may be configured to use at least a portion of the sensor data 1224 associated with the event 1124 to generate inquiry data 1250. In some implementations, the inquiry data 1250 may include one or more of the tentative results 1248 or supplemental data 1252. The inquiry component 1238 may be configured to provide inquiry data 1250 to one or more devices associated with one or more human associates.

An associate user interface is presented on the respective devices of associates. The associate may generate response data 1254 by selecting a tentative result 1248, entering new information, indicating that they are unable to answer the inquiry, and so forth.

The supplemental data 1252 comprises information associated with the event 1124 or that may be useful in interpreting the sensor data 1224. For example, the supplemental data 1252 may comprise previously stored images of the items 1104. In another example, the supplemental data 1252 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 1226 during presentation to an associate.

The inquiry component 1238 processes the response data 1254 provided by the one or more associates. The processing may include calculating one or more statistical results associated with the response data 1254. For example, statistical results may include a count of the number of times associates selected a tentative result 1248, determination of a percentage of the associates that selected a tentative result 1248, and so forth.

The inquiry component 1238 is configured to generate the output data 1126 based at least in part on the response data 1254. For example, given that a majority of the associates returned response data 1254 indicating that the item 1104 associated with the "pick" event 1124 is item 1104(10), the output data 1126 may indicate that the item 1104(10) was picked.

The inquiry component 1238 may be configured to selectively distribute inquiries to particular associates. For example, some associates may be better suited to answering particular types of inquiries. Performance data, such as statistical data about the performance of the associates, may be determined by the inquiry component 1238 from the response data 1254 provided by the associates. For example, information indicative of a percentage of different inquiries in which the particular associate selected response data 1254 that disagreed with the majority of associates may be maintained. In some implementations, test or practice inquiry data having a previously known correct answer may be provided to the associate for training or quality assurance purposes. The determination of the set of associates to use may be based at least in part on the performance data.

By using the inquiry component 1238, the event-determination component 1236 may be able to provide high reliability output data 1126 that accurately represents the event 1124. The output data 1126 generated by the inquiry component 1238 from the response data 1254 may also be used to further train the automated systems used by the inventory management system 1216. For example, the sensor data 1224 and the output data 1126, based on response data 1254, may be provided to one or more of the components of the inventory management system 1216 for training in process improvement. Continuing the example, this information may be provided to an artificial neural network, Bayesian network, and so forth, to further train these systems such that the confidence level 1244 and the tentative results 1248 produced in the future for the same or similar input is improved. Finally, as FIG. 13 illustrates, the servers 1132 may store and/or utilize other data 1260.

In some instances, the servers 1132 may further store the timestamp data 1258, timestamp data 1258 representing locations of users 1116 over time, and other data 1260.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A system comprising:
   one or more first cameras located within a facility configured to generate first image data representing an interaction between a user and an item;
   a mobile apparatus comprising:
   a basket to receive the item;
   one or more second cameras configured to generate second image data representing the item being placed into the basket;
   one or more processors; and
   one or more computer-readable media storing instructions that, when executed by the one or more processors, cause the one or more processors to perform operations comprising:
   determining a proximity of the user to the mobile apparatus within the facility based at least in part on proximity data generated by a proximity sensor of the mobile apparatus;
   controlling a power state of the mobile apparatus based at least in part on the proximity of the user to the mobile apparatus relative to a set threshold proximity;
   analyzing, based at least in part on a first detection of a first trigger and using a first machine learning model, the first image data to determine a first interaction between the user and the item;
   determining an identifier of the item based at least in part on the first image data;
   determining a first confidence score associated with the identifier of the item based at least in part on the first image data;
   analyzing, based at least in part on a second detection of a second trigger and using a second machine learning model, the second image data to determine a second interaction between the user and the item comprising the user placing the item in the basket subsequent to the first interaction;
   setting a flag to indicate the second interaction;
   determining, based at least in part on the flag, the identifier of the item based at least in part on the second image data;
   determining, a second confidence score associated with the identifier of the item based at least in part on the second image data and the first confidence score;
   updating, based on the second confidence score exceeding a first threshold, a virtual cart associated with the user operating the mobile apparatus to indicate addition of the item by adding the identifier of the item to virtual cart data associated with the virtual cart;
   determining, based on the second confidence score exceeding a second threshold, that the user is authorized to exit the facility through an automated checkout process;

determining, based on the second confidence score exceeding a third threshold greater than the second threshold, to charge a payment instrument associated with the virtual cart upon determining that the user has exited the facility;

determining, based on the second confidence score being greater than the second threshold and less than the third threshold, to further process the first image data and the second image data using one or more algorithms to increase the second confidence score before charging the payment instrument; and determining, based on the second confidence score being less than the second threshold, to instruct the user to proceed through a manual checkout process.

2. The system of claim 1, wherein determining the second confidence score is further based on:

a purchase history of the user; or sensor data from one or more additional sensors of the facility or mobile apparatus.

3. The system of claim 1, wherein the operations further comprise:

displaying a representation of the virtual cart on a display of the mobile apparatus in response to the second confidence score exceeding a fourth threshold, the representation comprising a total cost of items in the virtual cart.

4. A method comprising:

determining a proximity of a user to a mobile apparatus within a facility based at least in part on proximity data generated by a proximity sensor of the mobile apparatus;

controlling a power state of the mobile apparatus based at least in part on the proximity of the user to the mobile apparatus relative to a set threshold proximity;

determining, using a first machine learning model and based at least in part on first sensor data and a first detection of a first trigger, a first interaction with an item within the facility;

determining, based at least in part on the first sensor data, a first confidence score associated with the first interaction;

determining, using a second machine learning model and based at least in part on second sensor data and a second detection of a second trigger, a second interaction comprising the user placing the item in a receptacle of the mobile apparatus subsequent to the first interaction;

setting a flag to indicate the second interaction;

determining, based at least in part on the flag, an identifier of the item based at least in part on the second sensor image data;

determining, based at least in part on the second sensor data and the first confidence score, a second confidence score associated with the item being placed in the receptacle;

updating, based on the second confidence score exceeding a first threshold, a virtual cart associated with the user operating the mobile apparatus to indicate addition of the item by adding the identifier of the item to virtual cart data associated with the virtual cart;

determining, based on the second confidence score exceeding a second threshold greater than the first threshold, to charge a payment instrument associated with the virtual cart in response to determining that the user has exited the facility; and determining, based on the second confidence score being greater than the first threshold and less than the second threshold, to further process the first sensor data and the second sensor data using one or more algorithms to increase the second confidence score before charging the payment instrument.

5. The method as recited in claim 4, further comprising generating, for display at a display of the mobile apparatus and in response to the second confidence score exceeding the second threshold, a price associated with the virtual cart.

6. The method as recited in claim 4, further comprising:

determining, based at least in part on third sensor data, a third interaction comprising removal of the item from the receptacle;

determining, based at least in part on the third sensor data, a third confidence score associated with the third interaction; and updating the virtual cart in response to the third confidence score exceeding a third threshold.

7. The method as recited in claim 4, wherein determining the second confidence score is further based on at least a user identity, a user purchase history, or a path of the user within the facility.

8. The method as recited in claim 4, wherein determining to charge the payment instrument is further based on at least a payment instrument type, wherein:

the second threshold is reduced for a first payment instrument type associated with a customer account; and the second threshold is increased for a second payment instrument type.

9. The method as recited in claim 4, further comprising:

determining a first location of the mobile apparatus within the facility;

accessing a shopping list associated with the user;

determining a second location within the facility of an object included in the shopping list; and generating a notification for display at the mobile apparatus when the first location is within a threshold distance of the second location.

10. The method as recited in claim 9, wherein the notification comprises directions for traveling from the first location to the second location.

11. The method as recited in claim 4, further comprising:

receiving, via the mobile apparatus, a request for item information associated with the item;

determining, based on the request, the item information; and displaying the item information via the mobile apparatus.

12. The method as recited in claim 11, wherein:

receiving the request comprises receiving a voice input to a digital assistant; and displaying the item information comprises outputting an audible response from the digital assistant.

13. The method as recited in claim 4, further comprising:

receiving, via the mobile apparatus, item order information associated with the item available for order within the facility;

conveying instructions to a production system of the facility based on the item order information;

receiving item readiness information from the production system; and generating a notice based on the item readiness information for display by the mobile apparatus.

14. The method as recited in claim 4, further comprising determining, based on the second confidence score being less than the second threshold, to instruct the user to proceed through a manual checkout process.

15. The method as recited in claim 4, further comprising:

determining, based on the first sensor data, that the user exited the facility at a first time, and wherein:

determining to charge the payment instrument based on the second confidence score exceeding the second threshold comprises charging the payment instrument and providing a receipt to the user at a second time, wherein a first difference between the first time and the second time is less than a threshold time; and determining to further process the first sensor data and the second sensor data comprises charging the payment instrument and providing the receipt to the user at a third time, wherein a second difference between the first time and the third time is greater than the threshold time.

16. A system comprising:

one or more processors; and one or more computer-readable media storing instructions that, when executed by the one or more processors, cause the one or more processors to perform operations comprising:

determining a proximity of a user to a mobile apparatus within a facility based at least in part on proximity data generated by a proximity sensor of the mobile apparatus:

controlling a power state of the mobile apparatus based at least in part on the proximity of the user to the mobile apparatus relative to a set threshold proximity;

determining, using a first machine learning model and based at least in part on first sensor data and a first detection of a first trigger, a first interaction with an item within the facility;

determining, based at least in part on the first sensor data, a first confidence score associated with the first interaction;

determining, using a second machine learning model and based at least in part on second sensor data and a second detection of a second trigger, a second interaction comprising the user placing the item in a receptacle of the mobile apparatus subsequent to the first interaction;

setting a flag to indicate the second interaction;

determining, based at least in part on the flag, an identifier of the item based at least in part on the second sensor image data;

determining based at least in part on the second sensor data and the first confidence score, a second confidence score associated with the item being placed in the receptacle;

updating, based on the second confidence score exceeding a first threshold, a virtual cart associated with the user operating the mobile apparatus to indicate addition of the item by adding the identifier of the item to virtual cart data associated with the virtual cart;

determining, based on the second confidence score exceeding a second threshold greater than the first threshold, to charge a payment instrument associated with the virtual cart in response to determining that the user has exited the facility; and determining, based on the second confidence score being greater than the first threshold and less than the second threshold, to further process the first sensor data and the second sensor data using one or more algorithms to increase the second confidence score before charging the payment instrument.

17. The system as recited in claim 16, the operations further comprising generating, for display at a display of the mobile apparatus and in response to the second confidence score exceeding the second threshold, a price associated with the virtual cart.

18. The system as recited in claim 16, the operations further comprising:

receiving, via the mobile apparatus, a request for item information associated with the item;

determining, based on the request, the item information; and displaying the item information via the mobile apparatus.

19. The system as recited in claim 16, the operations further comprising:

determining a first location of the mobile apparatus within the facility;

accessing a shopping list associated with the user;

determining a second location within the facility of an object included in the shopping list; and generating a notification for display at the mobile apparatus when the first location is within a threshold distance of the second location.

20. The system as recited in claim 16, the operations further comprising:

receiving, via the mobile apparatus, item order information associated with the item available for order within the facility;

conveying instructions to a production system of the facility based on the item order information;

receiving item readiness information from the production system; and generating a notice based on the item readiness information for display by the mobile apparatus.

* * * * *